United States Patent
Lee et al.

(10) Patent No.: US 10,107,400 B2
(45) Date of Patent: Oct. 23, 2018

(54) GASKET

(71) Applicant: KUK IL INNTOT CO., LTD., Ulsan (KR)

(72) Inventors: Jong Chul Lee, Ulsan (KR); Eui Hwan Son, Ulsan (KR)

(73) Assignee: KUK IL INNTOT CO., LTD., Ulsan (KR)

( * ) Notice: Subject to any disclaimer, the term of this patent is extended or adjusted under 35 U.S.C. 154(b) by 441 days.

(21) Appl. No.: 14/939,000

(22) Filed: Nov. 12, 2015

(65) Prior Publication Data

US 2016/0138718 A1 May 19, 2016

Related U.S. Application Data

(60) Provisional application No. 62/081,109, filed on Nov. 18, 2014.

(51) Int. Cl.
| | |
|---|---|
| *F16L 23/18* | (2006.01) |
| *F16L 23/20* | (2006.01) |
| *F16J 15/08* | (2006.01) |
| *F16J 15/10* | (2006.01) |
| *F16J 15/12* | (2006.01) |

(52) U.S. Cl.
CPC ........... *F16J 15/102* (2013.01); *F16J 15/104* (2013.01); *F16J 15/122* (2013.01); *F16J 15/127* (2013.01); *F16L 23/18* (2013.01); *F16L 23/20* (2013.01); *F16J 15/0825* (2013.01); *F16J 2015/0856* (2013.01); *F16J 2015/0862* (2013.01)

(58) Field of Classification Search
CPC ........ F16L 23/18; F16L 23/20; F16J 15/0825; F16J 2015/085; F16J 2015/0856; F16J 2015/0862
See application file for complete search history.

(56) References Cited

U.S. PATENT DOCUMENTS

| | | | | |
|---|---|---|---|---|
| 843,394 | A * | 2/1907 | Haynes | F16J 15/0825 |
| | | | | 277/595 |
| 2,269,486 | A * | 1/1942 | Santoro | F16L 17/08 |
| | | | | 277/612 |
| 4,364,982 | A * | 12/1982 | Gee | F16J 15/125 |
| | | | | 277/610 |
| 5,511,797 | A * | 4/1996 | Nikirk | F16J 15/125 |
| | | | | 277/609 |
| 6,994,356 | B2 * | 2/2006 | Veiga | F16J 15/061 |
| | | | | 277/616 |
| 8,672,330 | B2 * | 3/2014 | Jung | F16J 15/061 |
| | | | | 277/592 |
| 8,684,363 | B2 * | 4/2014 | Krejci | F16J 15/122 |
| | | | | 277/609 |
| 9,285,062 | B2 * | 3/2016 | Jenkins | F16L 23/18 |
| 9,388,924 | B2 * | 7/2016 | Stubblefield | F16J 15/122 |
| 9,890,859 | B2 * | 2/2018 | Veiga | F16J 15/065 |
| 2005/0121859 | A1 * | 6/2005 | Seidel | F16J 15/061 |
| | | | | 277/628 |

(Continued)

*Primary Examiner* — Nicholas L Foster
(74) *Attorney, Agent, or Firm* — Cantor Colburn LLP

(57) ABSTRACT

Provided is a gasket characterized in that a perfect sealing can be achieved even under the vacuum and the high pressure operating conditions due to the insulation material embedded between the metal cores, the insulation material adhered or attached to the metal cores, or the sealing material additionally provided.

5 Claims, 26 Drawing Sheets

(56) References Cited

U.S. PATENT DOCUMENTS

| | | | |
|---|---|---|---|
| 2009/0033041 A1* | 2/2009 | Jung | F16J 15/061 |
| | | | 277/644 |
| 2009/0115139 A1* | 5/2009 | Jenkins | F16L 23/167 |
| | | | 277/610 |
| 2011/0115170 A1* | 5/2011 | Krejci | F16J 15/122 |
| | | | 277/647 |
| 2015/0330509 A1* | 11/2015 | Malus | F16J 15/0887 |
| | | | 277/608 |
| 2016/0265663 A1* | 9/2016 | Lee | F16J 15/0887 |

* cited by examiner

GASKET

TECHNICAL FIELD

The present invention relates to a gasket which is provided between the tube flanges and prevents leakage thereby.

BACKGROUND ART

Gasket is a general name for a static seal which is coupled to a fixed joint surface such as a joint surface of pressure container, tube flange, mechanical apparatus, and the like by using bolts and the like for preventing leakage; various shapes, materials, and the like are used according to the usage condition such as the type of the operating fluid, pressure, and temperature. In contrast to this, the general name of a dynamic seal which is used in a moving part is called packing.

Such terms have different names according to the installation location even for the same type of seal, for example, it is called as O-ring gasket when it used as a static one while it is called O-ring packing when it is used as a dynamic one even though they are same type of O-rings. Although such names are standardized, they are not strictly applied.

FIG. 1 is a drawing illustrating an example for a use aspect of such a gasket. A gasket 100 is installed between the joint surfaces of the tube flanges 200; the gasket 100, installed in this way, prevents the fluid flowing inside the tube from leaking outside the tube. Once the gasket 100 is installed between the tube flanges 200, a bolt 400 is inserted into the hole of the tube flange 200 and the both ends of the bolt is fastened by the nuts 200, 300 in order to prevent the joint surfaces of the tube flanges 200 from being separated. A metal washer 610 and an insulation washer 620 may be coupled in advance when the nuts 200, 300 are being coupled to the bolt 400. And, the bolt 300, which is inserted into the hole of the tube flange 200, may be inserted into the tube flange 200 as being inserted inside the insulation sleeve 500.

SUMMARY OF INVENTION

Technical Problem

An objective of the present invention is to provide a gasket having a more enhanced leakage prevention effect.

Another objective of the present invention is to provide a gasket capable of simultaneously achieving insulation under the vacuum and high pressure operating condition and a perfect sealing.

Yet another objective of the present invention is to provide a gasket satisfying 6FB fire safety conditions of the American Petroleum Institute (API).

Solution to Problem

To achieve the above described objectives, the present invention provides a gasket characterized in that and includes: a middle layer provided with a through hole; a first layer provided on any one surface of the middle layer; a second layer provided on the other surface of the middle layer; a first sealing layer formed on the first layer; a second sealing layer formed on the second layer; a first sawteeth-like embossed surface, formed between the first layer and the first sealing layer; and a second sawteeth-like embossed surface, formed between the second layer and the second sealing layer, wherein the heights of the ridges of the sawteeth of the first sawteeth-like embossed surface are substantially same, and the depths of the valleys between the sawteeth of the first sawteeth-like embossed surface are getting deeper as it travels from the center of the first sawteeth-like embossed surface towards the outside thereof; and the heights of the ridges of the sawteeth of the second sawteeth-like embossed surface are substantially same, and the depths of the valleys between the sawteeth of the second sawteeth-like embossed surface are getting deeper as it travels from the center of the second sawteeth-like embossed surface towards the outside thereof.

In addition, the present invention provides a gasket characterized in that and includes: a middle layer provided with a through hole; a first layer provided on any one surface of the middle layer; a second layer provided on the other surface of the middle layer; a first sealing layer formed on the first layer; a second sealing layer formed on the second layer; a first sawteeth-like embossed surface, formed between the first layer and the first sealing layer; and a second sawteeth-like embossed surface, formed between the second layer and the second sealing layer, wherein the heights of the ridges of the sawteeth of the first sawteeth-like embossed surface are substantially same, and the depths of the valleys between the sawteeth of the first sawteeth-like embossed surface are getting deeper as it travels from the outside of the first sawteeth-like embossed surface towards the center thereof; and the heights of the ridges of the sawteeth of the second sawteeth-like embossed surface are substantially same, and the depths of the valleys between the sawteeth of the second sawteeth-like embossed surface are getting deeper as it travels from the outside of the second sawteeth-like embossed surface towards the center thereof.

In addition, the present invention provides a gasket characterized in that and includes: a middle layer provided with a through hole; a first layer provided on any one surface of the middle layer; a second layer provided on the other surface of the middle layer; a first sealing layer formed on the first layer; a second sealing layer formed on the second layer; a first sawteeth-like embossed surface, formed between the first layer and the first sealing layer; and a second sawteeth-like embossed surface, formed between the second layer and the second sealing layer, wherein the heights of the ridges of the sawteeth of the first sawteeth-like embossed surface are substantially same, and the depths of the valleys between the sawteeth of the first sawteeth-like embossed surface are getting deeper as it travels from the through hole towards the outside thereof; and the heights of the ridges of the sawteeth of the second sawteeth-like embossed surface are substantially same, and the depths of the valleys between the sawteeth of the second sawteeth-like embossed surface are getting deeper as it travels from the through hole towards the outside thereof.

In addition, the present invention provides a gasket characterized in that and further includes: a third sealing layer, formed on the first layer, having a larger diameter than that of the first sealing layer, and a fourth sealing layer, formed on the second layer, having a larger diameter than that of the second sealing layer.

In addition, the present invention provides a gasket characterized in that the cross-section of the third sealing layer has the shape of a half circle, and the third sealing layer is made of rubber, and the cross-section of the fourth sealing layer has the shape of a half circle, and the fourth sealing layer is made of rubber.

In addition, the present invention provides a gasket characterized in that the third sealing layer is formed with graphite material, and the fourth sealing layer is formed with graphite material.

In addition, the present invention provides a gasket characterized in that the first sealing layer is formed with graphite material, and the second sealing layer is formed with graphite material.

Advantageous Effects of Invention

A gasket according to the present invention has the following effects.

First, it enhances the effect of leakage prevention. Especially, it has an effect of simultaneously achieving a perfect insulation under the vacuum and high pressure operating condition and a perfect sealing by the sealing member being additionally provided.

Second, it has an effect of preventing galvanic corrosion which may occur when using tube flanges of different materials.

Third, it has an effect of stably achieving sealing effect under the high temperature condition.

DESCRIPTION OF EMBODIMENTS

Figure 1:
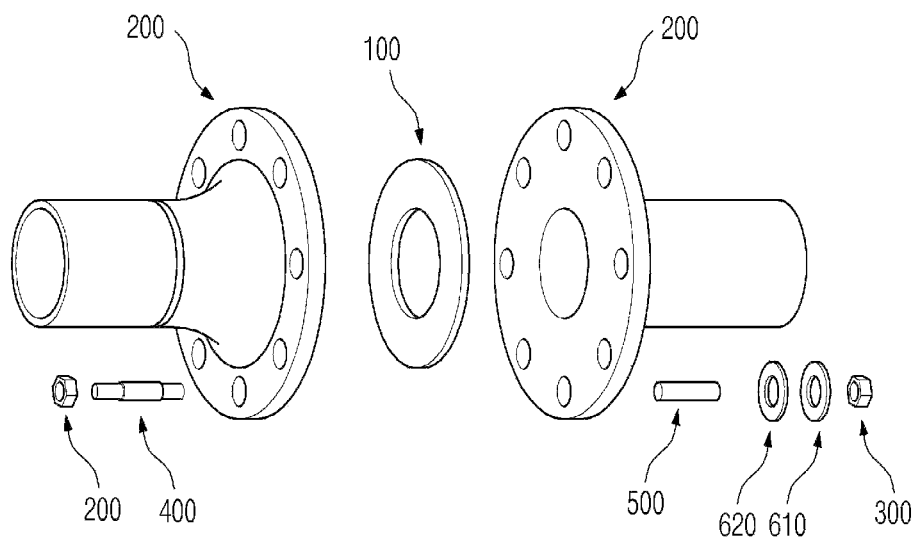
FIG. 1 illustrates an example for a use aspect of such a gasket.

Hereinafter, the exemplary embodiments of the present invention will be described in detail with reference to the accompanying drawings. Since the present invention, to which various modifications can be applied, may also have a wide variety of shapes; the specific embodiments will be exemplarily illustrated in the drawings and described in detail in the text. However, this is not to limit the present invention by a specific type of disclosure, but it should be understood in such a manner that it includes all modifications, equivalents, and substitutions included within the spirits and technological scope of the present invention.

Figure 2:
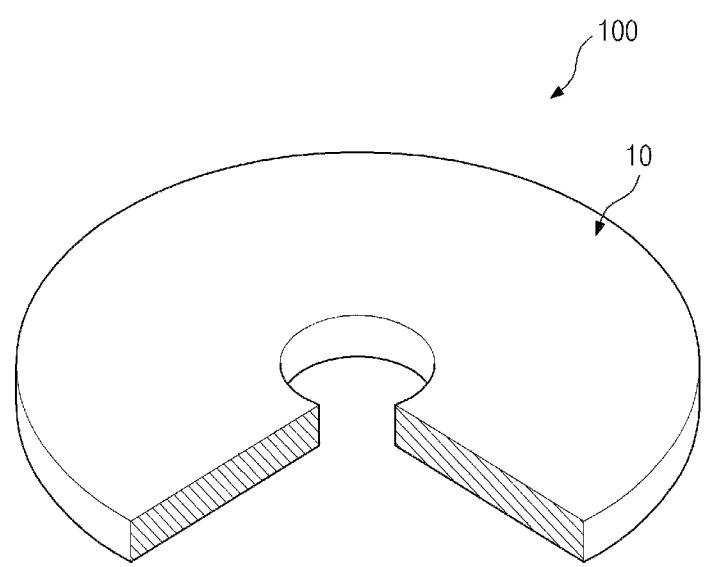
FIG. 2 illustrates a gasket according to the first exemplary embodiment of the present invention.

FIG. 2 illustrates a gasket according to the first exemplary embodiment of the present invention.

The gasket 100 according to the first exemplary embodiment may be provided in the shape of a circular ring comprising a circular through hole. And, such a shape of a circular ring may be referred to as a middle layer 10.

However, the through hole inside the middle layer may not necessarily be a circular shape, and the middle layer may not be necessarily provided in the shape of a circular ring; it may be changed according to the shape of the flange being adopted.

Such a gasket according to the first exemplary embodiment may be made of metal or non-metal, or may also be made of a combination of metal and non-metal. More specifically, it may be made of rubber, synthetic resin, expanded graphite, or the like. However, it is not limited to these materials but various materials may be selected and used according to the usage environment.

When selecting a fibrous material, aromatic polyamide fiber (aramid fiber), polytetrafluoroethylene (PTFE) resin, carbonized fiber (oxidation fiber, black oxide fiber), carbon fiber, graphite fiber, ceramic fiber, rock wool, metal fiber, phosphoric acid fiber, titanic acid kali fiber, and the like may be variously selected.

When selecting a non-fibrous material, expanded graphite or polytetrafluoroethylene (PTFE) resin may be selected.

When selecting a rubber material for the gasket, natural rubber (NR), synthetic natural rubber (IR), polybutadiene rubber (BR), butadiene styrene rubber (SBR), chloroprene (CR) which is known as Neoprene, butyl rubber (IIR), butadiene acrylonitrle (NBR), ethylene-propylene rubber (EPM/EPDM), hyplone (CSM), flouro rubber, silicon rubber (Si), poly sulfide rubber (T), polyacryl rubber (ACM/ANM), polyurethane rubber (U), and the like may be selected, but various materials other than the aforementioned ones may also be selected and used according to the usage environment.

When metal is used, lead, brass, copper, silver, nickel, aluminum, monel, iron, extra mild steel, titanium, and Inconel may be used; and SUS 304, SUS 410, SUS 309SCB, SUS 316, SUS 321, SUS 347, SUS 502, and Hystelloy may be used.

In this way, since a gasket according to the first exemplary embodiment of the present invention can be made of various materials, there is an effect of maximizing the sealing effect.

Figure 3:
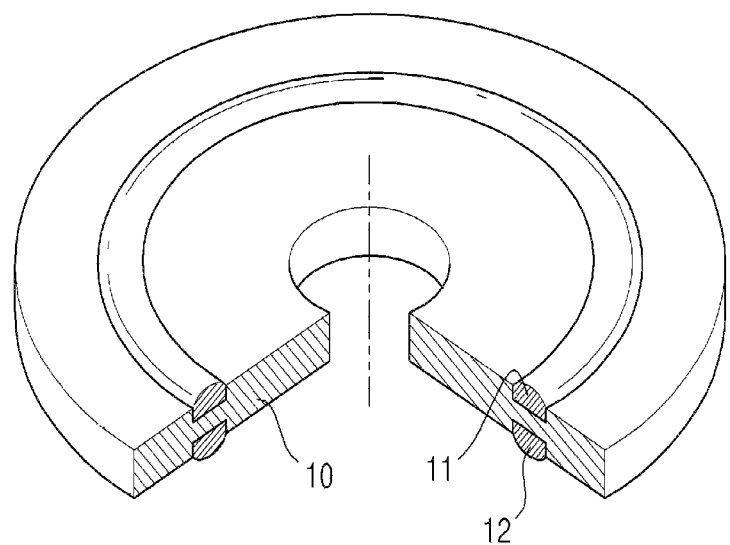
FIG. 3 illustrates a gasket according to the second exemplary embodiment of the present invention.

FIG. 3 illustrates a gasket according to the second exemplary embodiment of the present invention.

In a gasket according to the second exemplary embodiment, grooves may be formed in the upper surface or the lower surface of the middle layer 10. A sealing member may be inserted in the grooves formed in the upper surface or the lower surface; and the sealing member attached to the upper surface will be referred to as 'first sealing member' 11, and the sealing member attached to the lower surface will be referred to as 'second sealing member' 12.

The cross-sections of the first sealing member 11 and the second sealing member 12 may be half circle shape.

Although it is illustrated that a first sealing member 11 and a second sealing member 12 are provided in the upper surface and the lower surface of the gasket respectively according to the second exemplary embodiment, a gasket being provided with only one sealing member is not to be limited thereby.

The first sealing member 11 and the second sealing member 12 of a gasket according to the second exemplary embodiment may be made of neoprene rubber which can be applied not only to vacuum but to diverse pressure range. However, it is not limited to this, but various materials may be selected and used depending on the usage environment.

The middle layer 10 may be formed with insulation material, and one of the previously mentioned diverse materials may be selected and adopted, and also it may be made of epoxy or phenollic materials.

A gasket according to the second exemplary embodiment of the present invention has an effect of maintaining the sealing of the joint surface of the tube flanges more stably due to the first sealing member 11 and the second sealing member 12 formed on the outer surface of the middle layer 10.

Figure 4:
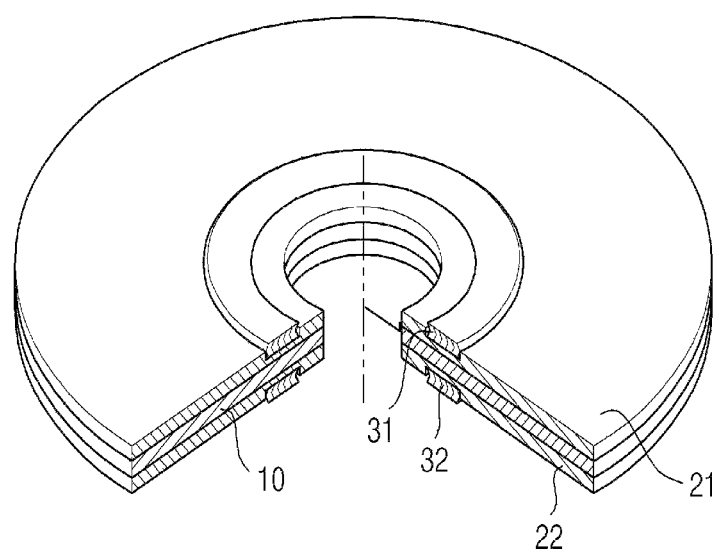
FIG. 4 illustrates a gasket according to the third exemplary embodiment of the present invention.

FIG. 4 illustrates a gasket according to the third exemplary embodiment of the present invention.

A gasket according to the third exemplary embodiment may include: a middle layer 10; a first layer 21; a second layer 22; a first spiral wound gasket unit 31; and a second spiral wound gasket unit 32.

In the third exemplary embodiment, the first layer 21 may be formed on any one surface of the middle layer 10, and the second layer 22 may be formed on the middle layer 10 located in the opposite side of the surface wherein the first layer 21 is formed. In the drawing, the first layer may refer to the layer formed on the upper surface of the middle layer 10, and the second layer may refer to the layer formed on the lower surface of the middle layer 10.

In addition, the middle layer 10, the first layer 21, and the second layer may be made as separate layers by using different materials; however, making the middle layer 10 as a single layer including the first layer 21 and the second layer 22 is not to be limited thereby. When making them as separate layers, the middle layer 10 may be made of insulation material while the first layer 21 and the second layer 22 may be made of metallic material.

A ring-shaped slot may be provided in the first layer 21. In addition, a first spiral wound unit 31 may be installed in the slot of the first layer 21. Also a ring-shaped slot may be provided in the second layer 22, and also a second spiral wound unit 32 may be installed in the slot of the first layer 21.

The first spiral wound unit 31 and the second spiral wound unit 32 may be made of a spiral wound gasket being formed in 'V' shape mixed with metallic hoop and filler; and one of graphite, asbestos, and polytetrafluoroethylene may be selected as a filler. The first spiral wound unit 31 and the second spiral wound unit 32 may be provided in both of the upper and the lower surfaces of the gasket; however, providing in any one surface thereof is not to be limited thereby.

A gasket according to the third exemplary embodiment has an effect of more enhancing the sealing effect due to the first spiral wound unit 31 and the second spiral wound unit 32 provided in the first layer 21 and the second layer 22.

Besides, since the middle layer 10 is comprised of insulation material, there is an effect of preventing galvanic corrosion which may occur when the tube flanges are made of different kinds of metal.

Figure 5:
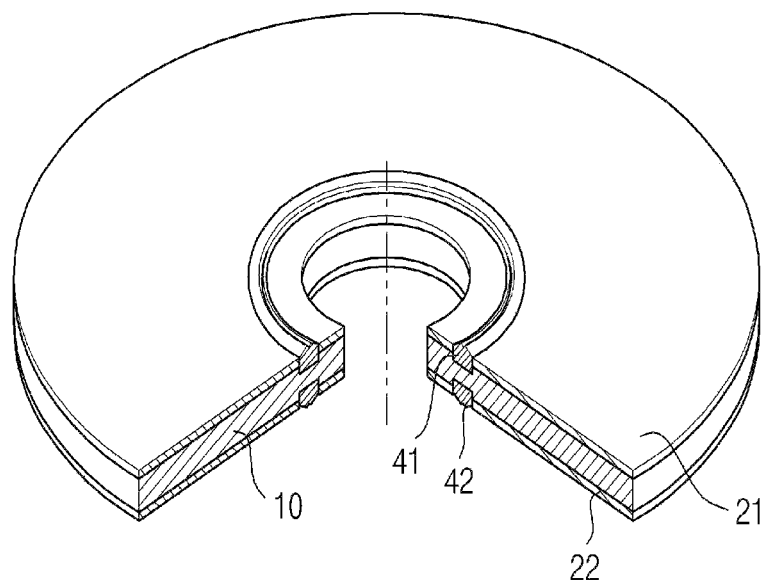
FIG. 5 illustrates a gasket according to the fourth exemplary embodiment of the present invention.

FIG. 5 illustrates a gasket according to the fourth exemplary embodiment of the present invention.

A gasket according to the fourth exemplary embodiment may include: a middle layer 10; a first layer 21; a second layer 22; a third sealing member 41; and a fourth sealing member 42.

The middle layer 10 may be made of metallic material, and preferably, made of SUS136L. The first layer 21 and the second layer 22 may be made of insulation material.

A ring-shaped slot may be provided in the middle layer 10 and the first layer 21 for accommodating the third sealing component 41. Such slot may be formed only in the first layer 21; however, it may also be formed to have a depth deep enough to penetrate the first layer 21 and reaching down to the middle layer 10.

Also, a ring-shaped slot may be provided in the middle layer 10 and the second layer 22 for accommodating the fourth sealing component 42. Such slot may be formed only in the second layer 22; however, it may be formed to reach down to the middle layer 10. However, such depth may be diversely selected depending on the usage environment.

The upper portions of the third sealing member 41 and the fourth sealing member 42 may be provided with two protruded portions. More specifically, one valley between the two ridges may be formed in the upper portions of the third sealing member 41 and the fourth sealing member 42. The lower portions of the third sealing member 41 and the fourth sealing member 42 may be a rectangular shape. The third sealing member 41 and the fourth sealing member 42 may be made of polytetrafluoroethylene which is known as Teflon.

According to a gasket of the fourth exemplary embodiment, there is an effect of achieving more perfect sealing through the tight contact by the third sealing member 41 and the fourth sealing member 42 wherein the protruded portions are provided.

Figure 6:
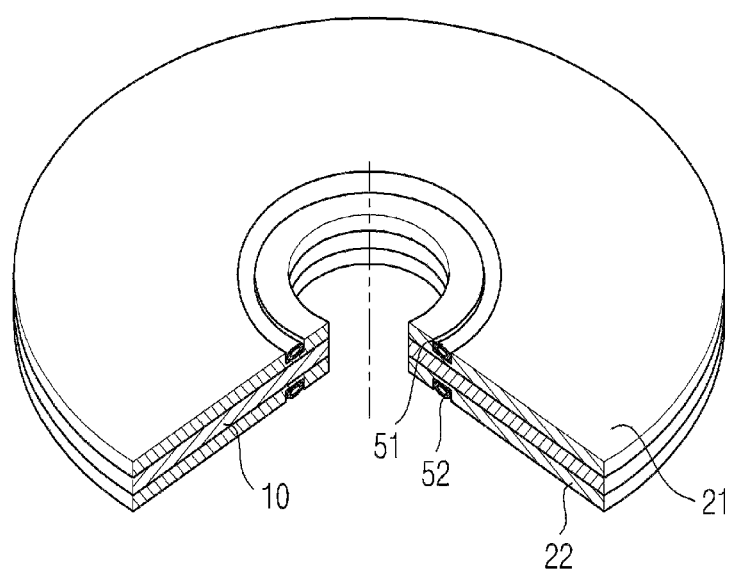
FIG. 6 illustrates a gasket according to the fifth exemplary embodiment of the present invention.

FIG. 6 illustrates a gasket according to the fifth exemplary embodiment of the present invention.

A gasket according to the fifth exemplary embodiment may include: a middle layer 10; a first layer 21; a second layer 22; a first O-ring member 51; and a second O-ring member 52.

The middle layer 10 may be made of insulation material, and an epoxy material may be selected. The first layer 21 and the second layer 22 may be made of metallic material.

A slot may be provided in the first layer 21 for accommodating the first O-ring member 51. Such slot may be formed to have an appropriate depth to reach down to the middle layer 10 passing through the first layer 21. The first O-ring member 51 may be mounted inside the slot formed in the first layer 21.

Also a slot may be provided in the second layer 22 for accommodating the second O-ring member 52. Such slot may also be formed to have an appropriate depth to reach down to the middle layer 10 passing through the second layer 22. The second O-ring member 52 may be mounted inside the slot formed in the second layer 22.

The first O-ring member 51 and the second O-ring member 52 may be made of metal.

According to a gasket of the fifth exemplary embodiment, there is an effect of achieving more perfect sealing since the first O-ring member 51 and the second O-ring member 52 are being pressed and tightly contacted by the sealing surfaces of the tube flanges.

Figure 7:
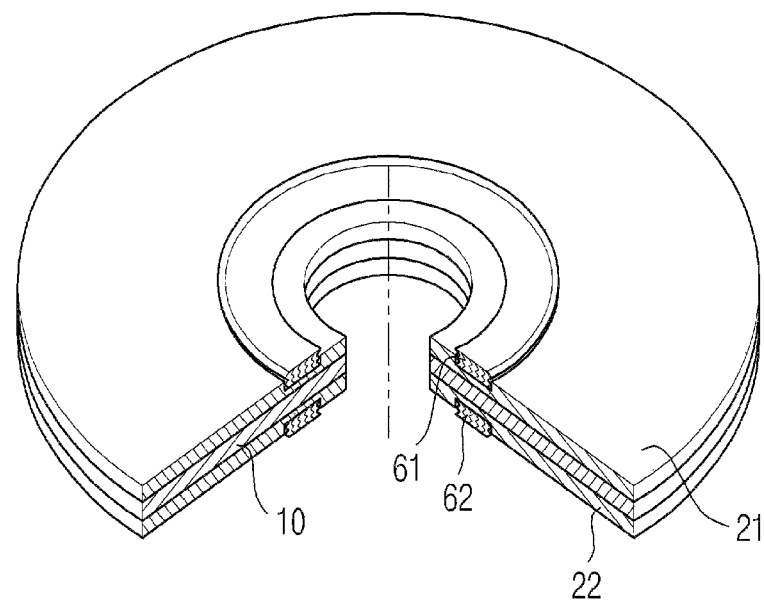
FIG. 7 illustrates a gasket according to the sixth exemplary embodiment of the present invention.

FIG. 7 illustrates a gasket according to the sixth exemplary embodiment of the present invention.

A gasket according to the sixth exemplary embodiment may include: a middle layer 10; a first layer 21; a second layer 22; a third spiral wound gasket unit 61; and a fourth spiral wound gasket unit 62.

The middle layer 10 may be made of insulation material; preferably, an epoxy material may be selected. A metallic material may be selected and formed as the first layer 21 and the second layer 22.

A slot may be formed on the first layer 21 for accommodating the third spiral wound gasket unit 61. The slot formed in the first layer 21 may be formed to reach down to the middle layer 10; and it may be formed to have an appropriate depth to penetrate a little bit further into the middle layer 10 after reaching the surface of the middle layer 10. However, such depth may be varied according to the diverse application environment.

A slot may also be formed on second layer 22 for accommodating the fourth spiral wound gasket unit 62. The slot may be formed to have an appropriate depth penetrating the second layer 22, and the fourth spiral wound gasket unit 62 may be mounted in the slot.

The third spiral wound gasket unit 61 and the fourth spiral wound gasket unit 62 may be formed to have a W-shaped cross-section mixed with metallic hoop and graphite filler.

A gasket according to the sixth exemplary embodiment has an effect of achieving perfect sealing and insulation under the vacuum and high pressure operating condition due to the third spiral wound gasket unit 61 and the fourth spiral wound gasket unit 62.

Figure 8:
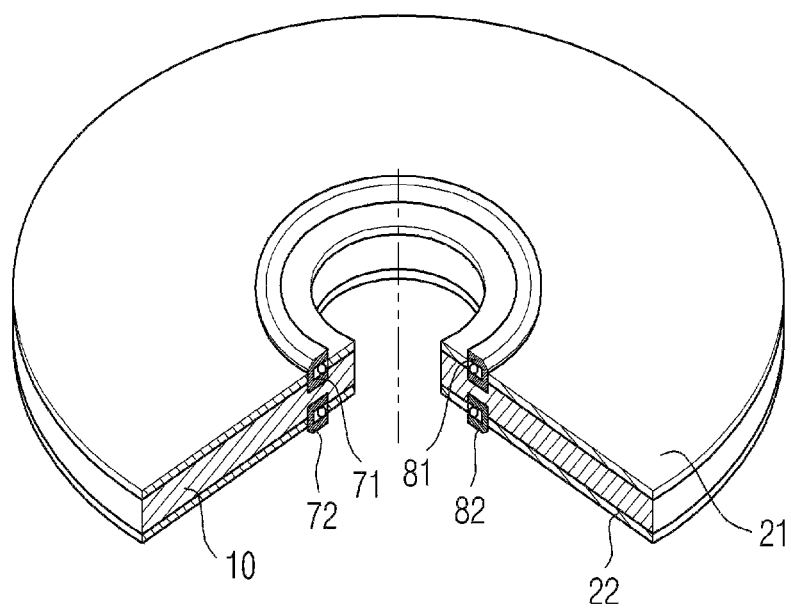
FIG. 8 illustrates a gasket according to the seventh exemplary embodiment of the present invention.

FIG. 8 illustrates a gasket according to the seventh exemplary embodiment of the present invention.

A gasket according to the seventh exemplary embodiment may include: a middle layer 10; a first layer 21; a second layer 22; a fifth sealing member 81; a sixth sealing member 82; a first spring 71; and the second spring 72.

The middle layer 10 may be made of metallic materials, and preferably made of SUS316L. The first layer 21 and the second layer 22 may be formed with an insulation material made of an epoxy material.

A slot may be formed on the first layer 21. And, such slot may be formed up to the middle layer 10 passing through the first layer 21; and a first spring 71 coupled with the fifth sealing member 81 may be mounted in the slot of the first layer 21.

For this implementation, an opening is formed in any one surface of the fifth sealing member 81 so that it may be formed to be like a Korean letter 'ㄷ' (i.e., a rectangle without one side) shape in overall. Thus, the first spring 71 can be inserted into the fifth sealing member 81 through the opening.

A slot may also be formed on the second layer 22. And, such slot may be extended up to the middle layer 10 passing through the second layer 22.

A second spring 72 coupled with the sixth sealing member 82 may be mounted in the slot formed on the second layer 22.

For coupling the second spring 72 with the sixth sealing member 82, an opening is formed in any one surface of the sixth sealing member 82 so that it may be formed to be like a Korean letter 'ㄷ' shape in overall. The second spring 72 is coupled to the sixth sealing member 82 whose cross-section is like a Korean letter 'ㄷ' shape in overall, and thereafter it can be mounted inside the slot formed on the second layer 22.

The openings of the fifth sealing member 81 and the sixth sealing member 82 may be formed facing the flow path inside the tube flanges.

The openings of the fifth sealing member 81 and the sixth sealing member 82 may be expanded due to the pressure of the fluid when the fluid is leaking out from the tube flanges. In other words, the opening shaped like a Korean letter 'ㄷ' is expanded towards the lower or the upper direction and tightly in contact with the sealing surface; as a result, there is an effect of preventing the additional leakage of the fluid. For this implementation, the fifth sealing member 81 and the sixth sealing member 82 may be made of polytetrafluoroethylene material, that is, Teflon.

Figure 9:
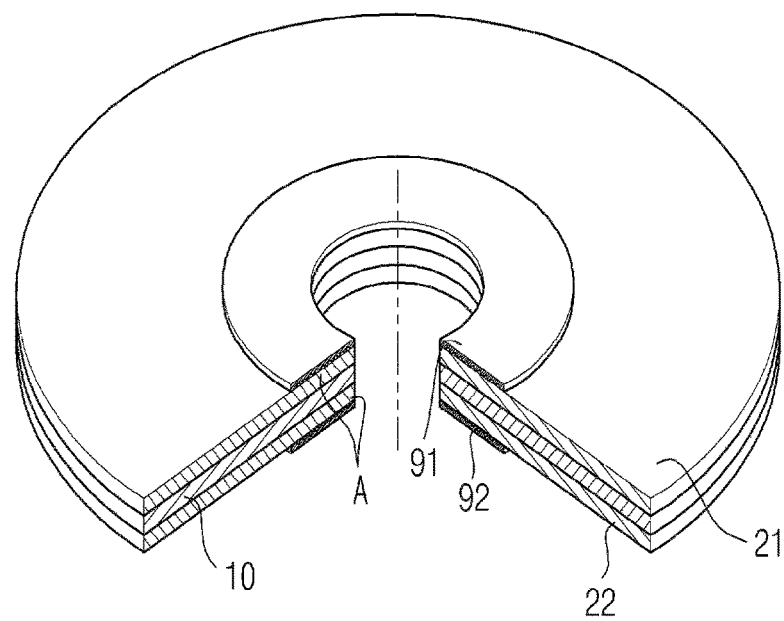
FIGS. 9 and 10 illustrate a gasket according to the eighth exemplary embodiment of the present invention.
Figure 10:
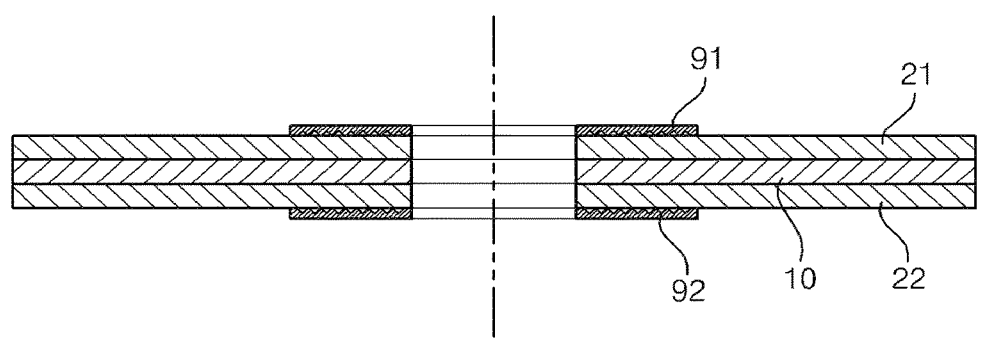

FIGS. 9 and 10 illustrate a gasket according to the eighth exemplary embodiment of the present invention.

A gasket according to the eighth exemplary embodiment may include: a middle layer 10; a first layer 21; a second layer 22; a first sealing layer 91; and a second sealing layer 92.

The first layer 21 may be formed on any one surface of the middle layer 10, and the second layer 22 may be formed on the middle layer 10 located in the opposite side of the surface wherein the first layer 21 is formed. The middle layer 10 may be made of insulation material, and the first layer 21 and the second layer 22 may be made of metallic material.

A sawteeth-like embossed surface may be provided in the shape of a stripe near the area close to the through hole of the first layer 21. The first sealing layer 91 may be formed on the sawteeth-like embossed surface. Similarly to this, a sawteeth-like embossed surface may also be provided in the shape of a stripe near the area close to the through hole of the second layer 22. The second sealing layer 92 may be formed above such sawteeth-like embossed surface.

The first sealing layer 91 and the second sealing layer 92 may be formed with graphite material. And, the sealing layer 91 and the second sealing layer 92 which are formed with such graphite material may be more stably adhered to the first layer 21 and the second layer 22 due to the sawteeth-like embossed surface.

In addition, since the thickness of the portion, wherein the first sealing layer 91 and the second sealing layer 92 are formed, is formed to be thicker than other portion of the gasket, it can be tightly in contact with the sealing surface of the tube flange. Therefore, there is an effect of preventing the fluid flowing inside the tube flange from leaking out.

Figure 11:
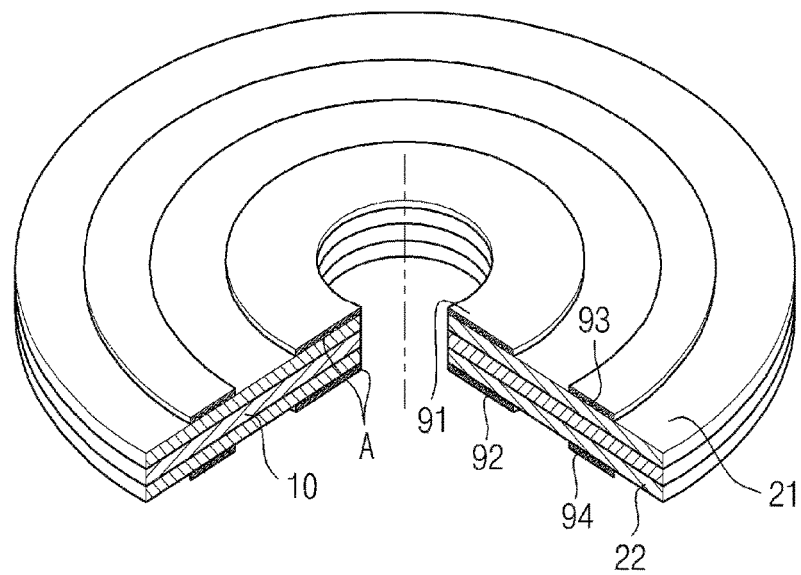
FIGS. 11 and 12 illustrate a gasket according to the ninth exemplary embodiment of the present invention.
Figure 12:
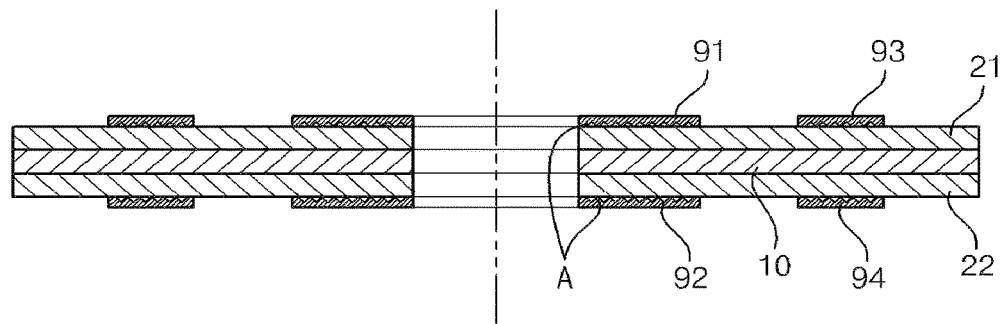

FIGS. 11 and 12 illustrate a gasket according to the ninth exemplary embodiment of the present invention.

A gasket according to the ninth exemplary embodiment may further include a third sealing layer 93 and a fourth sealing layer 94 in the outer surfaces of the first layer 21 and the second layer 22 of the gasket according to the eighth exemplary embodiment.

In other words, a third sealing layer 93 having a larger radius than that of the first sealing layer 91 may be formed on the first layer 21, and a fourth sealing layer 94 having a larger radius than that of the second sealing layer 92.

And, during the process of forming the third sealing layer 93 and the fourth sealing layer 94 on the first layer 21 and the second layer 22, the teeth-like embossed surfaces may be formed on the first layer 21 and the second layer 22.

A gasket according to the ninth exemplary embodiment has an effect of more effectively preventing the leaks due to the sealing layers additionally provided.

Figure 13:
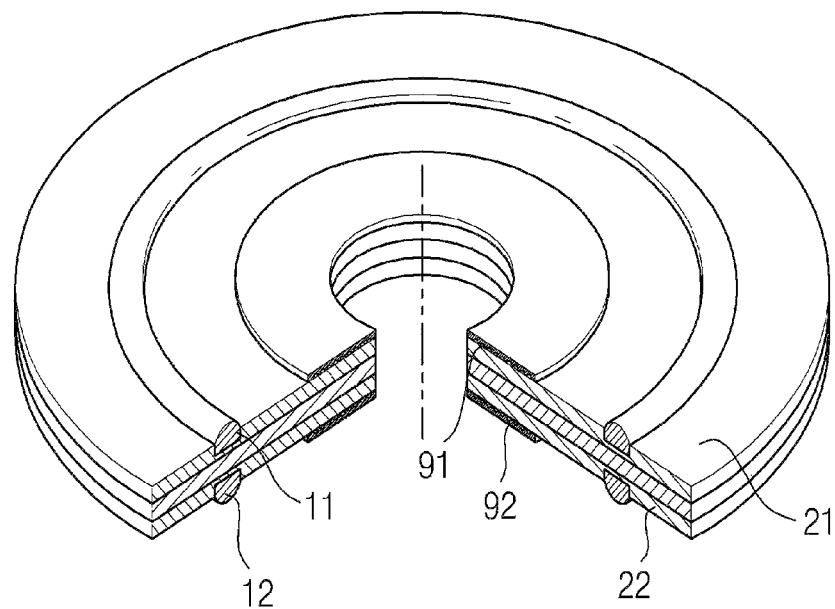
FIGS. 13 and 14 illustrate a gasket according to the tenth exemplary embodiment of the present invention.
Figure 14:
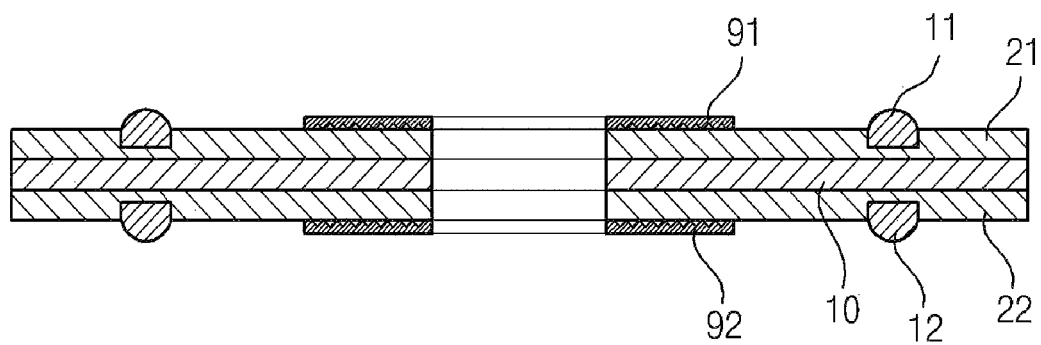

FIGS. 13 and 14 illustrate a gasket according to the tenth exemplary embodiment of the present invention.

A gasket according to the tenth exemplary embodiment may further include a first sealing member 11 and a second sealing member 12 in the gasket according to the eighth exemplary embodiment.

The first sealing member 11 and the second sealing member 12 may be mounted inside the slots formed on the first layer 21 and the second layer 22 respectively.

The first sealing member 11 may be made to be a ring-shape having a larger radius than that of the first sealing layer 91, and the second sealing member 12 may be made to be a ring-shape having a larger radius than that of the second sealing layer 92.

According to a gasket of the tenth exemplary embodiment, the first sealing layer 91 and the second sealing layer 92 made of graphite are provided in the area near the through hole thereof; and the first sealing member 11 and the second sealing member 12 made of rubber are provided near the outer circumferential surface of the gasket, thus, there is an effect of further enhancing the sealing effect.

Figure 15:
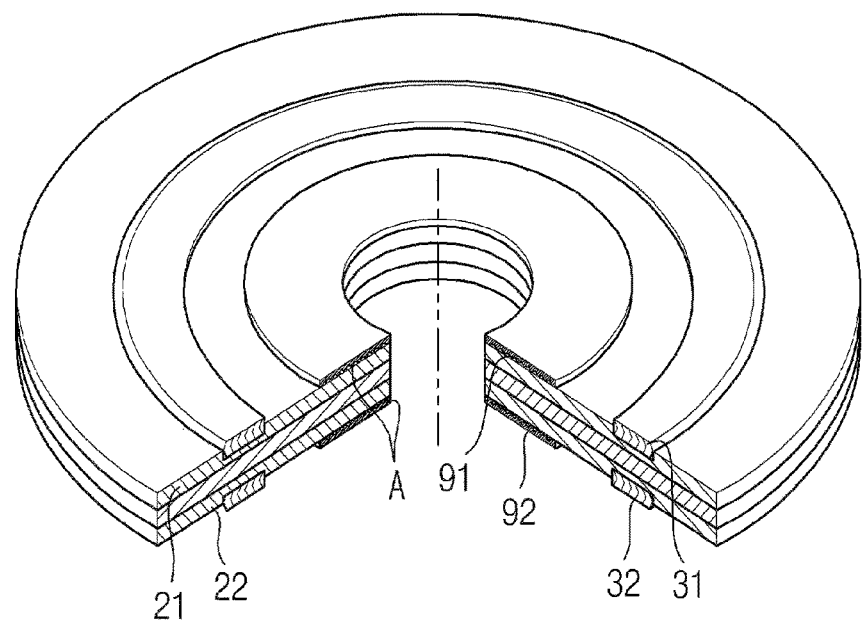
FIGS. 15 and 16 illustrate a gasket according to the eleventh exemplary embodiment of the present invention.
Figure 16:
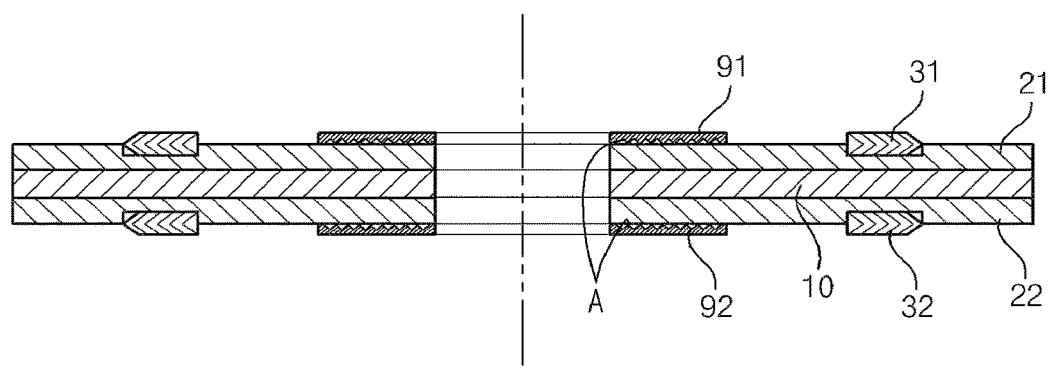

FIGS. 15 and 16 illustrate a gasket according to the eleventh exemplary embodiment of the present invention.

A gasket according to the eleventh exemplary embodiment may further include a first spiral wound unit 31 and a second spiral wound unit 32 near the outer circumferential surface of the gasket.

The first spiral wound unit 31 mounted on the first layer 21 may have a larger radius than that of the first sealing layer 91. Also, the second spiral wound unit 32 mounted on the second layer 22 may have a larger radius than that of the second sealing layer 92.

A gasket according to the eleventh exemplary embodiment has an effect of more strengthening the flange and the sealing of the flange.

Figure 17:
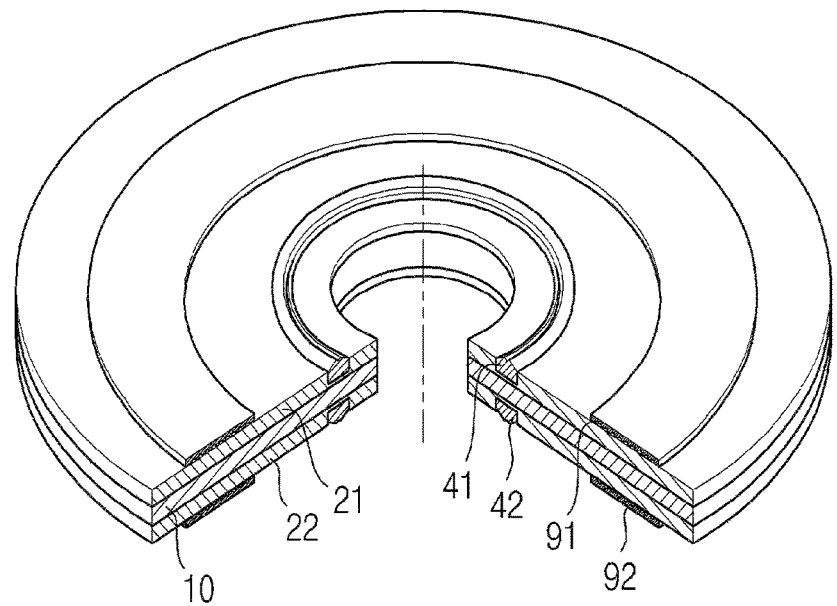
FIGS. 17 and 18 illustrate a gasket according to the twelfth exemplary embodiment of the present invention.
Figure 18:
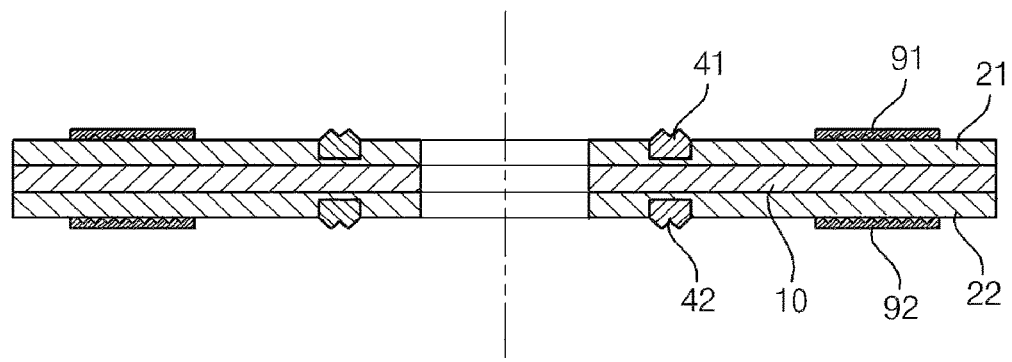

FIGS. 17 and 18 illustrate a gasket according to the twelfth exemplary embodiment of the present invention.

A gasket according to the twelfth exemplary embodiment may include: a middle layer 10; a first layer 21; a second layer 22; a third sealing member 41; a fourth sealing member 42; a first sealing layer 91; and a second sealing layer 92.

The first layer 21 may be formed in the upper surface of the middle layer 10, and the second layer 22 may be formed in the lower surface of the middle layer 10.

A slot may be formed in the area near the through hole of the first layer 21, and such slot may be formed to have an appropriate depth from the surface of the first layer 21 towards the middle layer 10. Another slot may also be formed in the (vertically) symmetrical area (with respect to the area of the first layer 21) in the second layer 22, and the slot may be formed to have an appropriate depth from the surface of the second layer 22 towards the middle layer 10.

In such slot of the first layer 21 and the second layer 22, the third sealing member 41 and the fourth sealing member 42 may be mounted respectively.

In addition, the first sealing layer 91 and the second sealing layer 92 according to the twelfth exemplary embodiment may have larger radiuses than those of the third sealing member 41 and the fourth sealing member 42 respectively. A teeth-like embossed surface may be provided between the first layer 21 and the first sealing layer 91, and another teeth-like embossed surface may also be provided between the second layer 22 and the second sealing layer 92.

According to a gasket of the twelfth exemplary embodiment, the inner side of the joint surface between the tube flanges is sealed by the third sealing member 41 and the fourth sealing member 42; and the outer side of the joint surface is sealed by the first sealing layer 91 and the second sealing layer 92, thus, there is an effect of more enhancing the sealing capability thereby.

Figure 19:
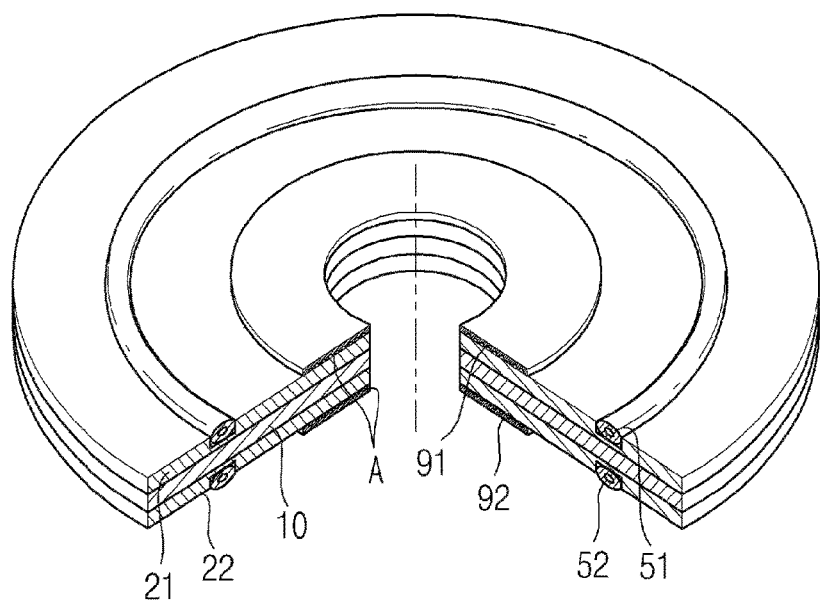
FIGS. 19 and 20 illustrate a gasket according to the thirteenth exemplary embodiment of the present invention.
Figure 20:
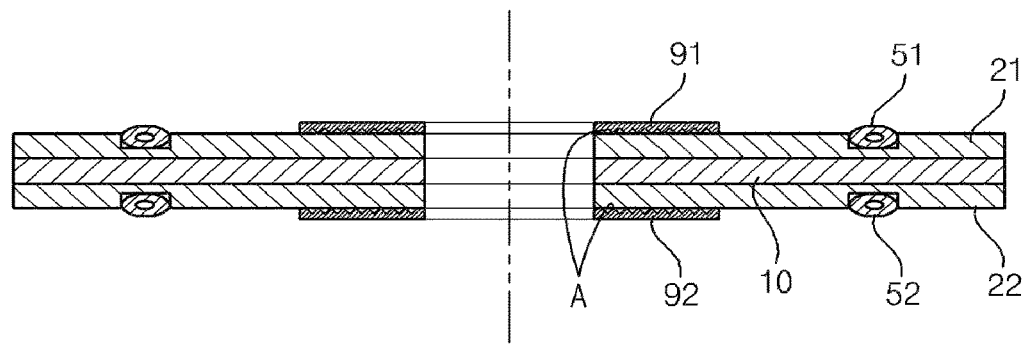

FIGS. 19 and 20 illustrate a gasket according to the thirteenth exemplary embodiment of the present invention.

A gasket of the thirteenth exemplary embodiment may further include a first O-ring member 51 and a second O-ring member 52 in addition to the gasket of the eighth exemplary embodiment.

Slots may be formed in the first layer 21 and the second layer 22 respectively in order to accommodate the first O-ring member 51 and the second O-ring member 52. Such slots are formed in the first layer 21 and the second layer 22, and the depth thereof may be extended so as to reach down to the middle layer 10.

The radius of the first O-ring member 51 may be larger than the radius of the first sealing layer 91. Also, the radius of the second O-ring member 52 may be larger than the radius of the second sealing layer 92.

Therefore, according to the gasket of the thirteenth exemplary embodiment, the inner side of the joint area of the tube flanges are sealed with the first sealing layer 91 and the second sealing layer 92; the outer side thereof is sealed with the first O-ring member 51 and the second O-ring member 52; thus, dual sealing is provided thereby, so there is an effect of providing a more enhanced sealing property.

Figure 21:
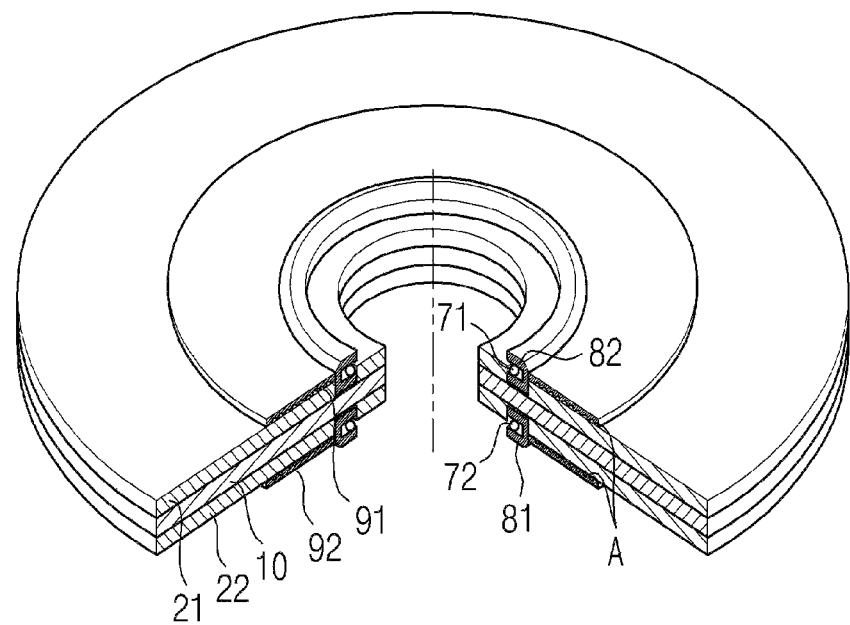
FIGS. 21 and 22 illustrate a gasket according to the fourteenth exemplary embodiment of the present invention.
Figure 22:
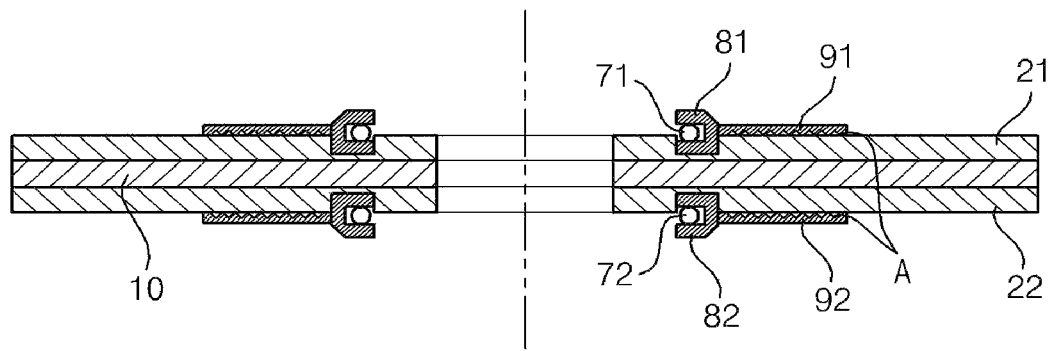

FIGS. 21 and 22 illustrate a gasket according to the fourteenth exemplary embodiment of the present invention.

A gasket according to the fourteenth exemplary embodiment may further include: a fifth sealing member 81; a sixth sealing member 82; a first spring 71; and a second spring 72 in addition to the gasket of the eighth exemplary embodiment.

The first spring 71 may be coupled to the fifth sealing member 81 of the gasket of the fourteenth exemplary embodiment; and the second spring 72 may be additionally provided inside the sixth sealing member 82. And, the fifth sealing member 81, where the first spring 71 is coupled to, may be mounted in the slot formed in the first layer 21; and the sixth sealing member 82, where the second spring 72 is coupled to, may be mounted in the slot formed in the second layer 22.

The radius of the slot, wherein the fifth sealing member 81 and the sixth sealing member 82 are mounted, may be smaller than the radius of the first sealing layer 91 or the second sealing layer 92.

In addition, a sawteeth-like embossed surface may be provided between the first sealing layer 91 and the first layer 21; and another sawteeth-like embossed surface may also be provided between the second sealing layer 92 and the second layer 22.

According to a gasket of the fifteenth exemplary embodiment of the present invention, the fluid path of the tube flanges are double sealed by the fifth sealing member 81, the sixth sealing member 82, the first sealing layer 91, and the second sealing layer 92; thus, there is an effect of protecting the joint area of the tube flanges more safely. In other words, when the fluid is leaking out from the tube flanges, the openings of the fifth sealing member 81 and the sixth sealing member 82 are widening further so that the leaking out of the fluid is prevented, thereby enhancing the sealing effect further.

Figure 23:
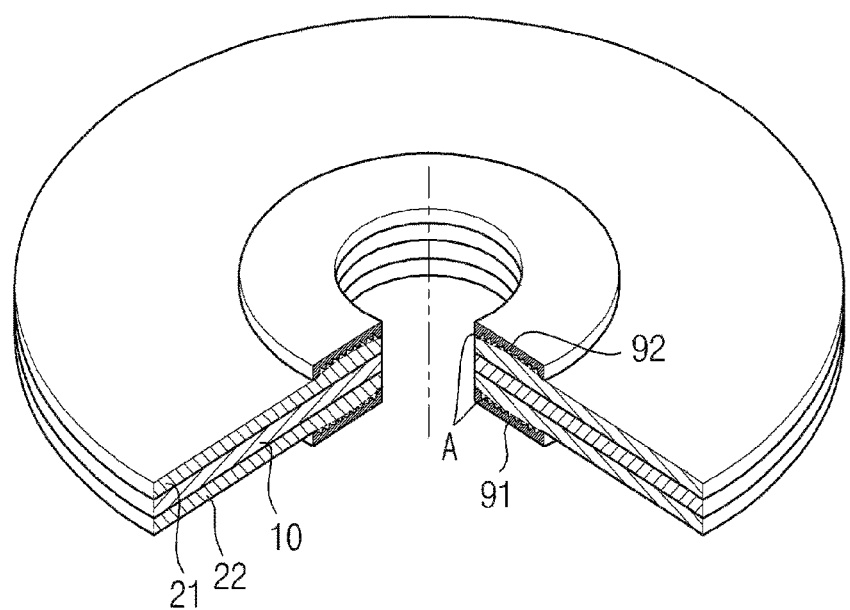
FIGS. 23 and 24 illustrate a gasket according to the fifteenth exemplary embodiment of the present invention.
Figure 24:
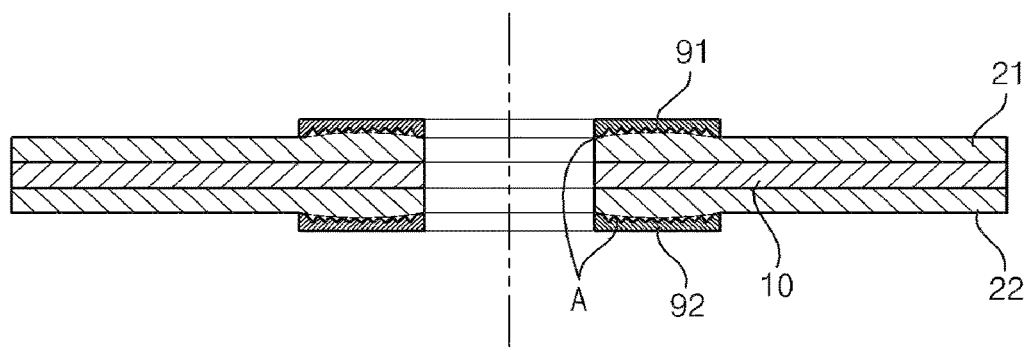

FIGS. 23 and 24 illustrate a gasket according to the fifteenth exemplary embodiment of the present invention.

A gasket according to the fifteenth exemplary embodiment may include: a middle layer 10; a first layer 21; a second layer 22; a first sealing layer 91; and a second sealing layer 92.

A sawteeth-like embossed surface may be formed in the first layer 21 and the second layer 22. The height of the ridge of such sawteeth-like embossed surface may be substantially same. The valley between the ridges may be getting deeper as it travels from the center of the sawteeth-like embossed surface towards the outer direction. Thus, the sawteeth-like embossed surface may have gradual curvature of a sphere.

The first sealing layer 91 and the second sealing layer 92 may be formed on the sawteeth-like embossed surfaces of the first layer 21 and the second layer 22 respectively. The first sealing layer 91 and the second sealing layer 92 formed in this way may be made of graphite.

A gasket according to the sixteenth exemplary embodiment has effects of more strongly combining the first sealing layer 91 and the second sealing layer 92 to the first layer 21 and the second layer 22 respectively through such sawteeth-like embossed surface, and enhancing the sealing property even the pressure applied to the entire gasket is being changed. Besides, the portions, wherein the first sealing layer 91 and the second sealing layer 92 are formed, are higher than the remaining surfaces; so there is an effect of preventing the leaks, which may occur in the tube flanges, more effectively.

Figure 25:
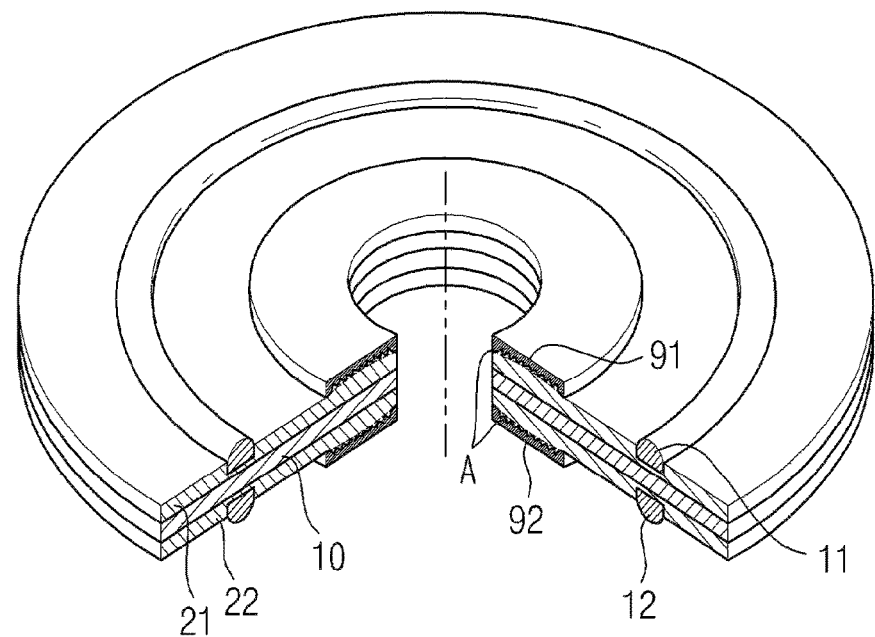
FIGS. 25 and 26 illustrate a gasket according to the sixteenth exemplary embodiment of the present invention.
Figure 26:
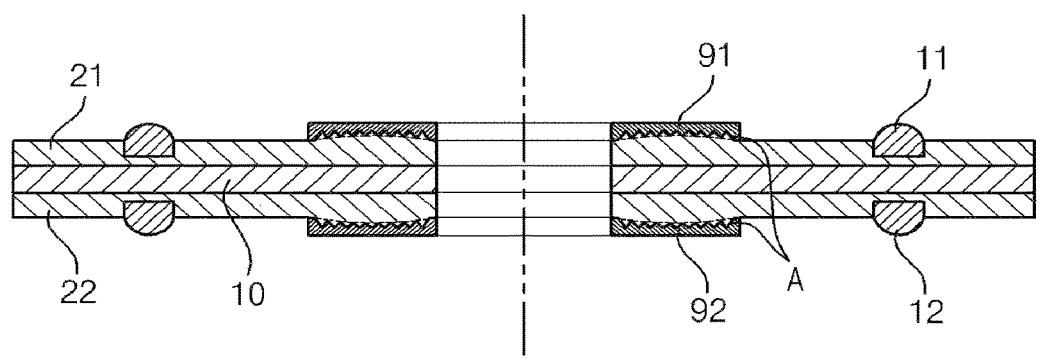

FIGS. 25 and 26 illustrate a gasket according to the sixteenth exemplary embodiment of the present invention.

A gasket according to the sixteenth exemplary embodiment may further include a first sealing member 11 and a second sealing member 12 in the gasket according to the fifteenth exemplary embodiment.

In addition, slots having the shape of a rectangle may be formed in the first layer 21 and the second layer 22 respectively for accommodating the first sealing member 11 and a second sealing member 12 formed in this way. The radius of the first sealing member 11 may be larger than the radius of the first sealing layer 91, and the radius of the second sealing member 12 may be larger than the radius of the second sealing layer 92.

A gasket according to the sixteenth exemplary embodiment has an effect of more enhancing the leak prevention effect since the joint area of the flanges is double sealed by using the sealing layer and the sealing member formed in this way.

Figure 27:
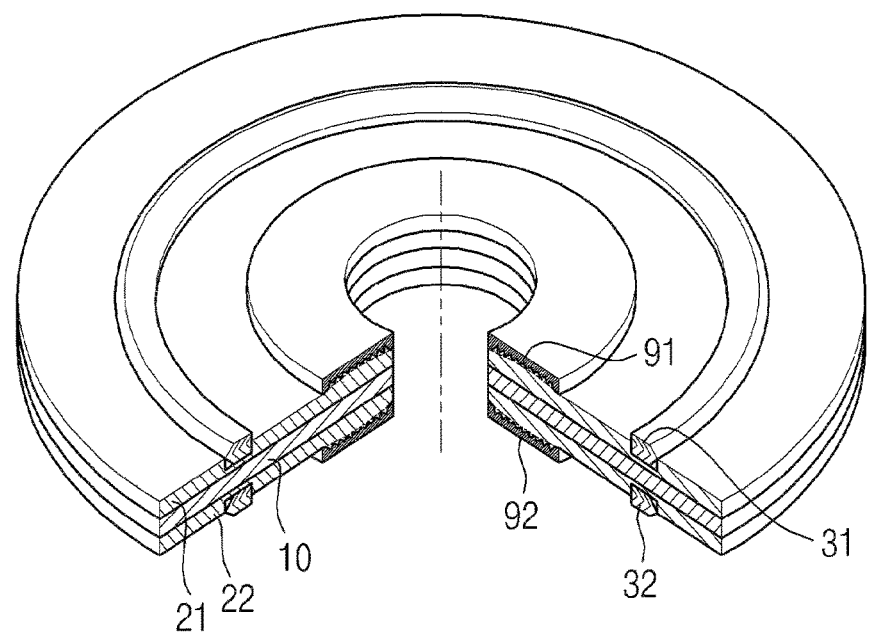
FIGS. 27 and 28 illustrate a gasket according to the seventeenth exemplary embodiment of the present invention.
Figure 28:
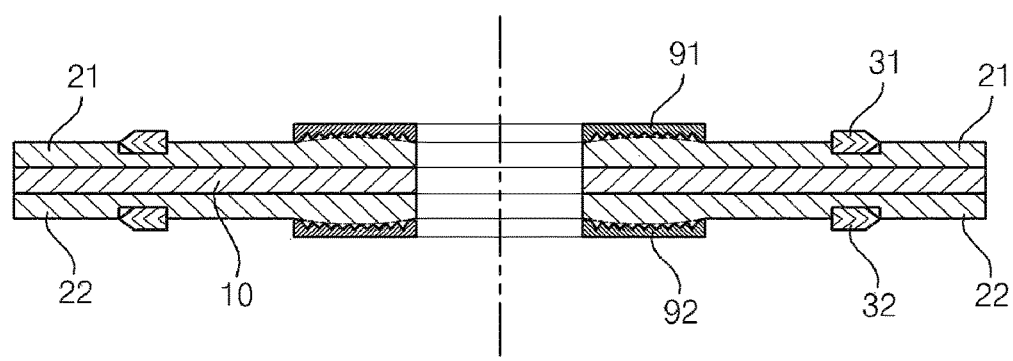

FIGS. 27 and 28 illustrate a gasket according to the seventeenth exemplary embodiment of the present invention.

A gasket of the seventeenth exemplary embodiment may further include a first spiral wound unit 31 and a second spiral wound unit 32 in addition to the gasket of the fifteenth exemplary embodiment.

The first spiral wound unit 31 may be accommodated in the outer side of the sawteeth-like embossed surface which is accommodating the first sealing layer 91, and the second spiral wound unit 32 may be accommodated in the outer side of the sawteeth-like embossed surface which is accommodating the second sealing layer 92.

The first layer 21 and the second layer 22 of the seventeenth exemplary embodiment may include slots for respectively accommodating the first spiral wound unit 31 and the second spiral wound unit 32 formed in this way.

However, the slots are not necessarily required for accommodating the first spiral wound unit 31 and the second spiral wound unit 32, but the first spiral wound unit 31 and the second spiral wound unit 32 may be directly mounted in the first layer 21 and the second layer 22 using a separate means of attachment. For example, it can be attached using an adhesive material such as glue.

According to a gasket of the seventeenth exemplary embodiment of the present invention, the inner side of the sealing surface of the flange is double sealed by the first sealing layer 91 and the second sealing layer 92; and the outer side of the sealing surface of the flange is double sealed by the first spiral wound unit 31 and the second spiral wound unit 32, thus, the sealing effect is more enhanced thereby. Besides, the openings of the V-shaped hoops of the first spiral wound unit 31 and the second spiral wound unit 32 are facing the direction of the fluid path, so if the fluid is leaking out from the joint surface of the flange, the hoops are more widened and being tightly contacted to the joint surface, thus, there is an effect of enhancing the sealing property.

Figure 29:
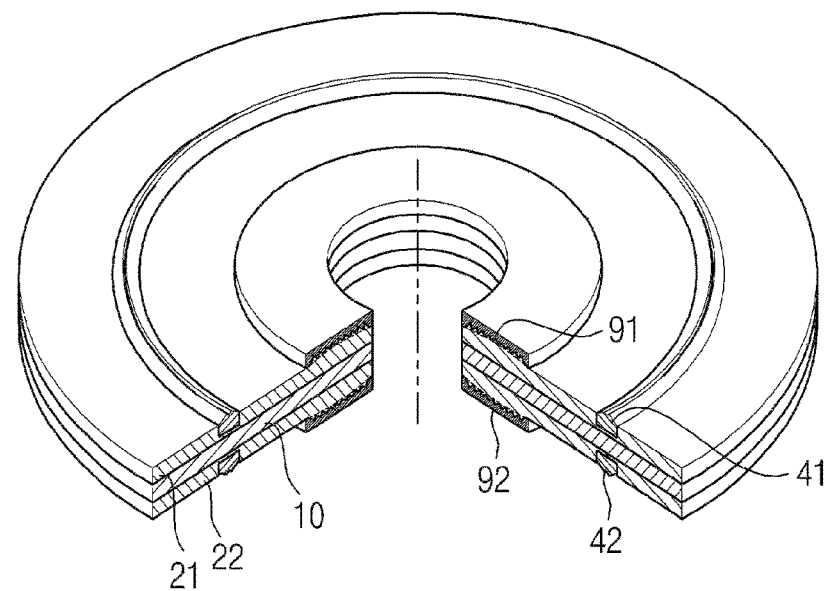
FIGS. 29 and 30 illustrate a gasket according to the eighteenth exemplary embodiment of the present invention.
Figure 30:
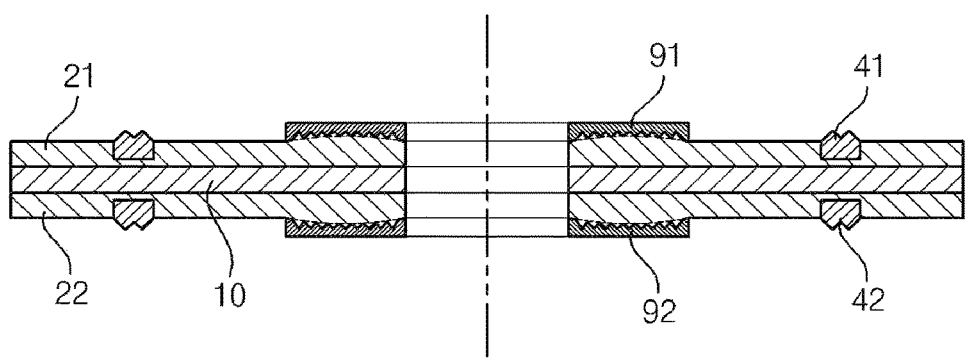

FIGS. 29 and 30 illustrate a gasket according to the eighteenth exemplary embodiment of the present invention.

A gasket according to the eighteenth exemplary embodiment may include: a middle layer 10; a first layer 21; a second layer 22; a first sealing layer 91; and a second sealing layer 92; a third sealing member 41; and a fourth sealing member 42.

The third sealing member 41 and the fourth sealing member 42 may be made in a way that each of the upper portions thereof has two ridges and one valley. The third sealing member 41 made in this way may be mounted on the first layer 21 in the outer side of the first sealing layer 91. The fourth sealing member 42 may also be mounted on the second layer 22 in the outer side of the second sealing layer 92.

Each of the first layer 21 and the second layer 22 may be provided with a slot for accommodating the third sealing member 41 and the fourth sealing member 42.

According to a gasket of the eighteenth exemplary embodiment, the sealing effect of the sealing surface of the tube flanges is more enhanced due to the double sealing effect.

Figure 31:
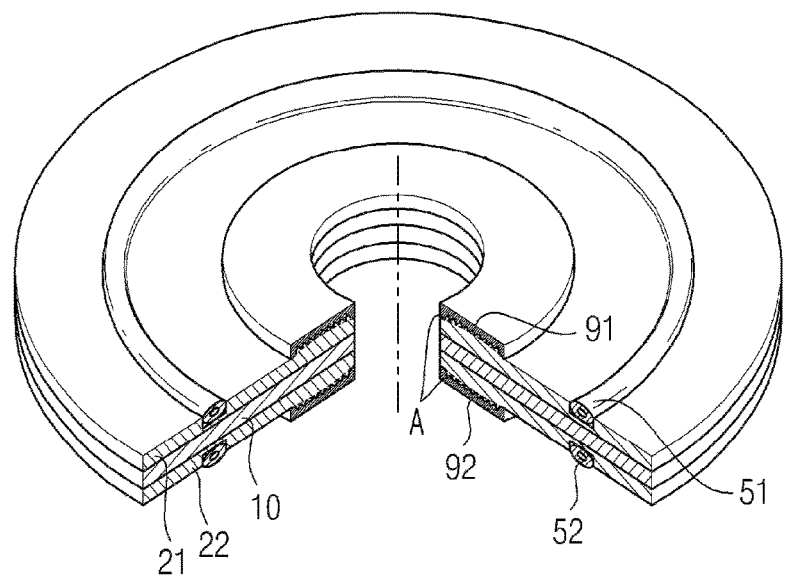
FIGS. 31 and 32 illustrate a gasket according to the nineteenth exemplary embodiment of the present invention.
Figure 32:
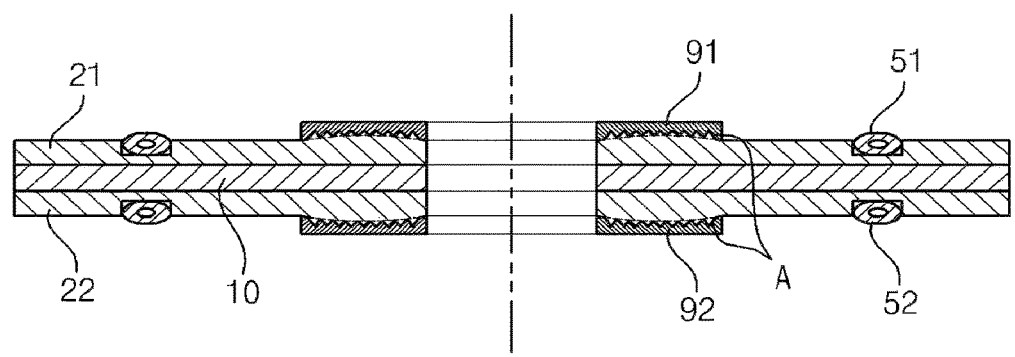

FIGS. 31 and 32 illustrate a gasket according to the nineteenth exemplary embodiment of the present invention.

A gasket according to the nineteenth exemplary embodiment may further include a first O-ring member 51 and a second O-ring member 52 in addition to the gasket according to the fifteenth exemplary embodiment.

The first layer 21 and the second layer 22 may be provided with slots for accommodating such O-ring members; and such slots may be formed up to the middle layer penetrating through the first layer 21 and the second layer 22 respectively. However, the depth thereof may be appropriately selected according to the diverse environments where the gasket is being applied to.

According to a gasket of the twentieth exemplary embodiment, the inner portion of the joint surface of the flange is sealed by the first sealing layer 91 and the second sealing layer 92; and the outer portion is further sealed by the first O-ring member 51 and the second O-ring member 52, so that the leak prevention effect may be enhanced thereby.

Figure 33:
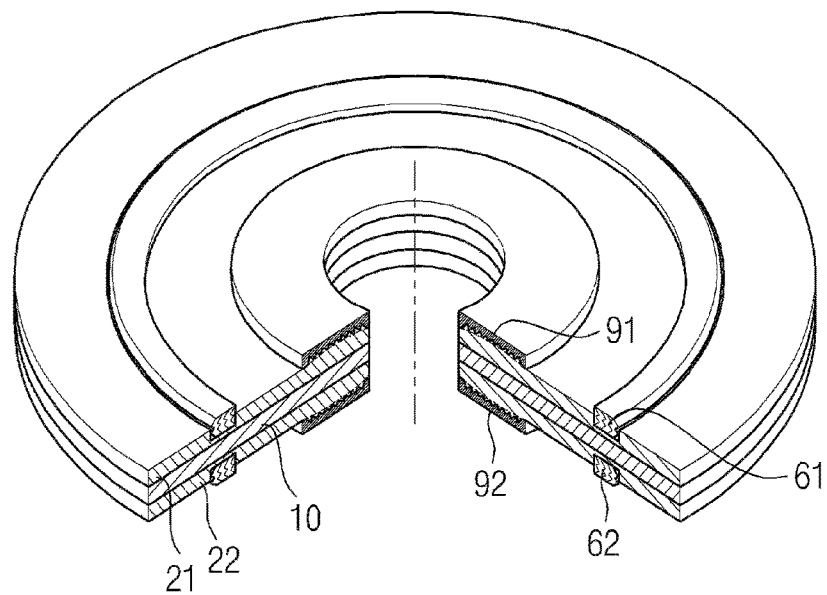
FIGS. 33 and 34 illustrate a gasket according to the twentieth exemplary embodiment of the present invention.
Figure 34:
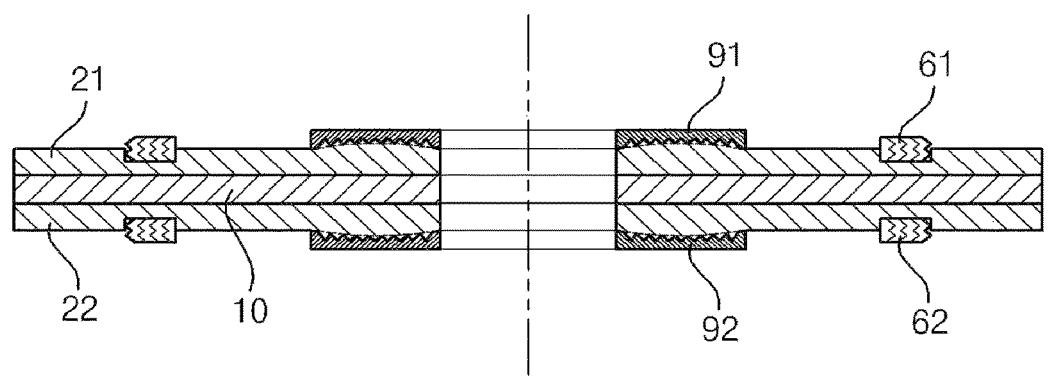

FIGS. 33 and 34 illustrate a gasket according to the twentieth exemplary embodiment of the present invention.

A gasket according to the twentieth exemplary embodiment may further include a third spiral wound gasket unit 61 and a fourth spiral wound gasket unit 62 in addition to the gasket according to the fifteenth exemplary embodiment.

Such the third spiral wound gasket unit 61 and the fourth spiral wound gasket unit 62 may be mounted outside the sawteeth-like embossed surface formed on the first layer 21 and the second layer 22 respectively. In other words, the third spiral wound gasket unit 61 and the fourth spiral wound gasket unit 62 may have larger radiuses than those of the first sealing layer 91 and the second sealing layer 92.

A gasket according to the twentieth exemplary embodiment has an effect of sealing the joint surface of the tube flanges more strongly by forming a double sealing.

Figure 35:
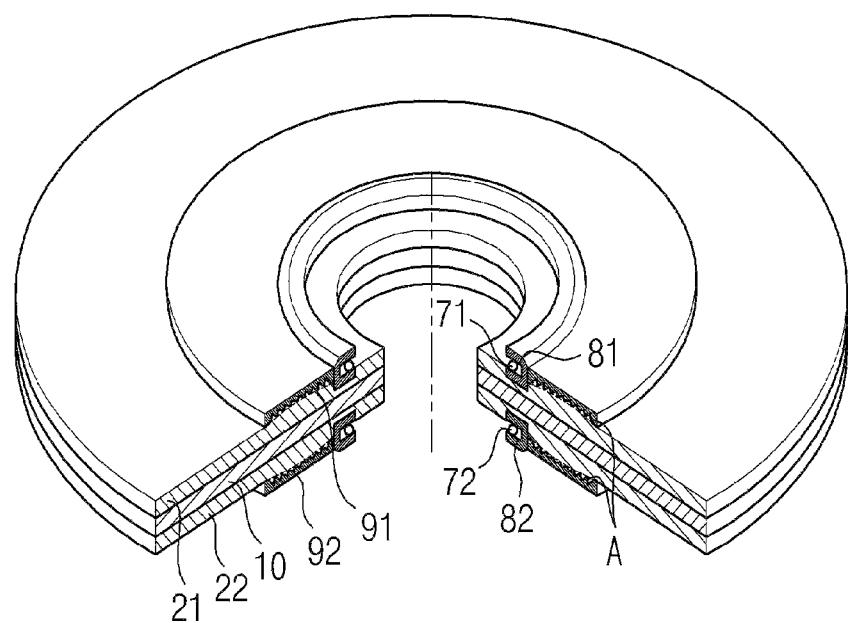
FIGS. 35 and 36 illustrate a gasket according to the twenty-first exemplary embodiment of the present invention.
Figure 36:
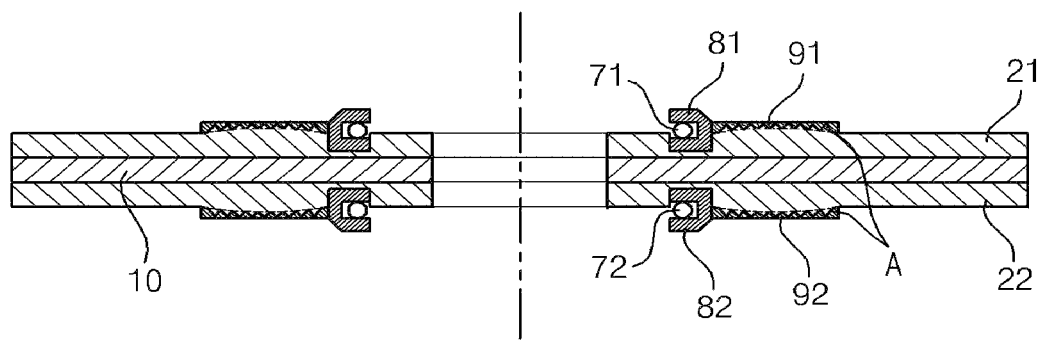

FIGS. 35 and 36 illustrate a gasket according to the twenty-first exemplary embodiment of the present invention.

A gasket according to the twenty-first exemplary embodiment may further include a first spring 71, a second spring 72, a fifth sealing member 81, and a sixth sealing member 82 near the fluid path of the flange inside the first sealing layer 91 and the second sealing layer 92 of the gasket according to the fifteenth exemplary embodiment.

The first spring 71 may be mounted inside the fifth sealing member 81 via the opening of the fifth sealing member 81, and the second spring 72 may be mounted inside the sixth sealing member 82 via the opening of the sixth sealing member 82.

The fifth sealing member 81 wherein the first spring 71 is mounted, and the sixth sealing member 82 wherein the second spring 72 is mounted may be respectively mounted in the slots formed in the first layer 21 and the second layer 22, and such the slots may be formed in the inner side of the sawteeth-like embossed surface and at the location close to the fluid path of the tube flanges.

According to a gasket of the twenty-first exemplary embodiment, the fluid which may be initially leaking out from the joint surface of the tube flanges can be protected from the leak as the openings of the fifth sealing member 81 and the sixth sealing member 82 are being expanded, thus, there is an effect of enhancing the sealing property thereof.

Figure 37:
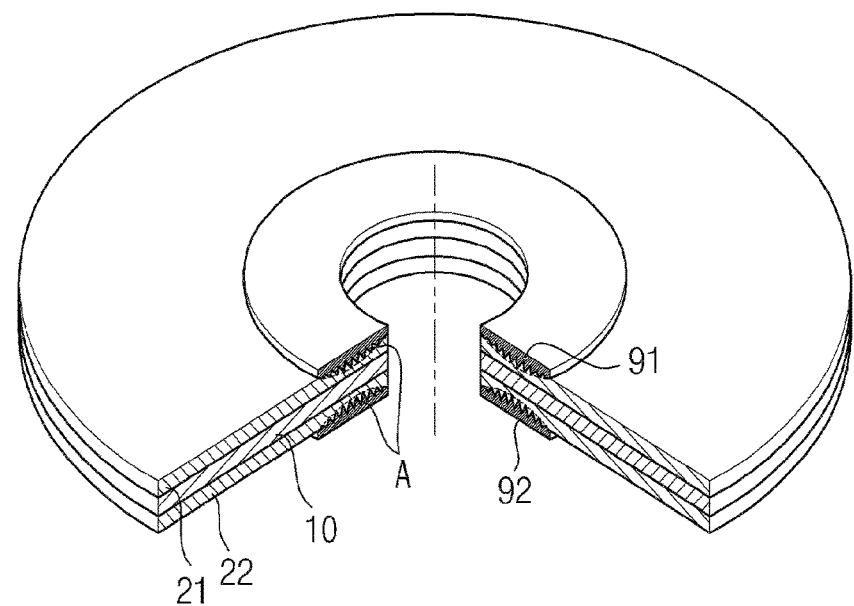
FIGS. 37 and 38 illustrate a gasket according to the twenty-second exemplary embodiment of the present invention.
Figure 38:
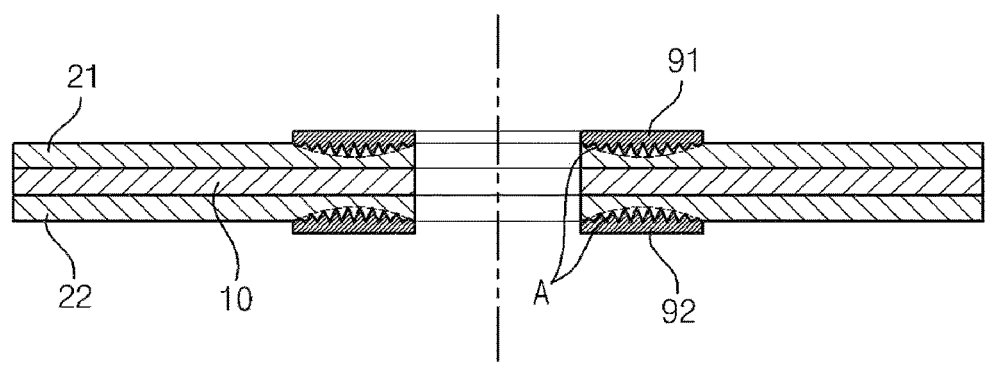

FIGS. 37 and 38 illustrate a gasket according to the twenty-second exemplary embodiment of the present invention.

The heights of the ridges of the sawteeth of the sawteeth-like embossed surfaces formed in the first layer 21 and the second layer 22 of the gasket of the twenty-second exemplary embodiment may be substantially same. The valleys of the sawteeth of the sawteeth-like embossed surfaces may be getting deeper as they travel from the outer side towards the center.

That is, if the bottom surface of the sawteeth-like embossed surface of the twenty-second exemplary embodiment is a concave one; the bottom surface of the twenty-third exemplary embodiment may correspond to a convex one.

A first sealing layer 91 and a second sealing layer 92 made of graphite may be formed above such sawteeth-like embossed surface.

According to a gasket of the twenty-second exemplary embodiment, the first sealing layer 91 and the second sealing layer 92 located in the inner side of the gasket are being contacted and coupled to the first layer 21 and the second layer 22 more strongly; thus, there is an effect of more enhancing the sealing property thereof.

Figure 39:
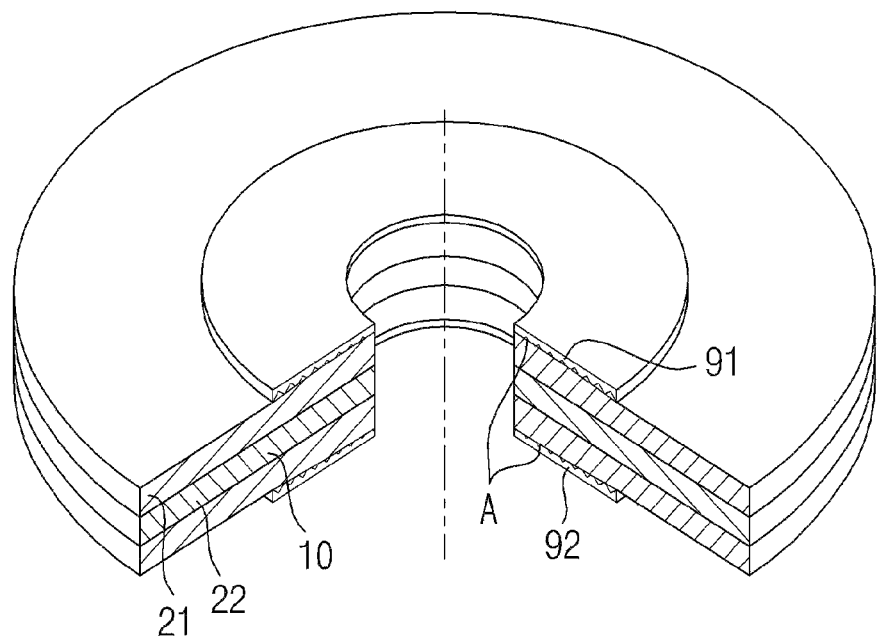
FIGS. 39 and 40 illustrate a gasket according to the twenty-third exemplary embodiment of the present invention.
Figure 40:
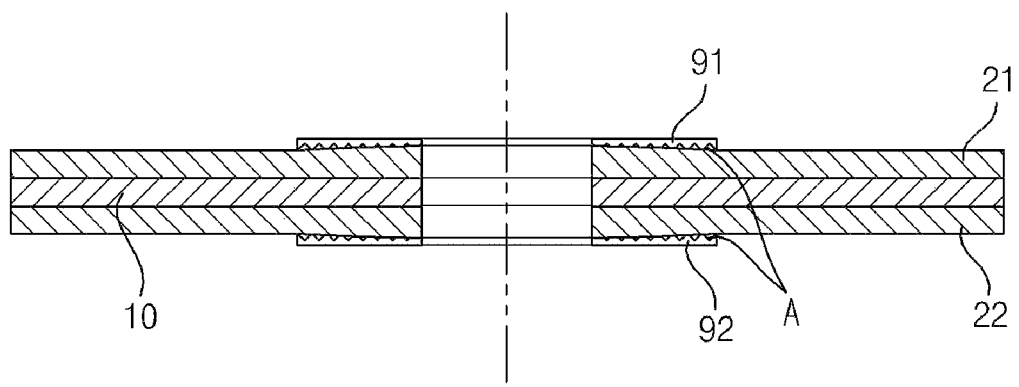

FIGS. 39 and 40 illustrate a gasket according to the twenty-third exemplary embodiment of the present invention.

The heights of the ridges of the sawteeth of the sawteeth-like embossed surfaces of the gasket according to the twenty-third exemplary embodiment may be substantially same. The valleys of the sawteeth may be getting deeper as they travel from the center towards the outer side. Therefore, for the case of the gasket of the twenty-third exemplary embodiment, the shape of the bottom portion may be a concave one like a half-circle in overall, in contrast to the shapes of the bottom portions of the sawteeth-like embossed surfaces of the previous gaskets are flat, concave, and convex ones. Also, it may be appeared to be concave in overall with respect to the central axis of the through hole of the gasket.

According to a gasket of the twenty-third exemplary embodiment, the gasket of the inner side of the joint surface of the flanges are pressed more strongly; thus, there is an effect of more enhancing the sealing property thereof.

Figure 41:
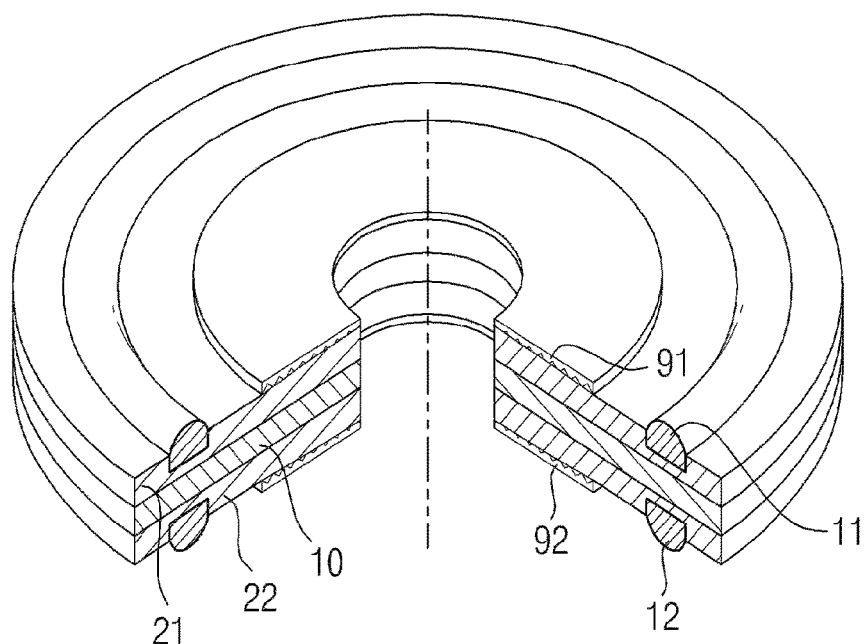
FIGS. 41 and 42 illustrate a gasket according to the twenty-fourth exemplary embodiment of the present invention.
Figure 42:
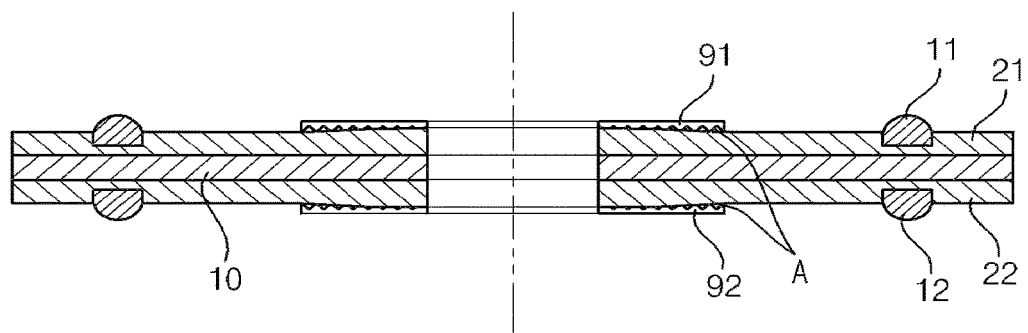

FIGS. 41 and 42 illustrate a gasket according to the twenty-fourth exemplary embodiment of the present invention.

A gasket according to the twenty-fourth exemplary embodiment may further include a first sealing member 11 and a second sealing member 12 in addition to the gasket of the twenty-third exemplary embodiment.

In other words, the inner side of the joint surface of the flange is sealed by the first sealing layer 91 and the second sealing layer 92; and the outer side thereof is sealed by the first sealing member 11 and the second sealing member 12, thus, there is an effect of double sealing.

Figure 43:
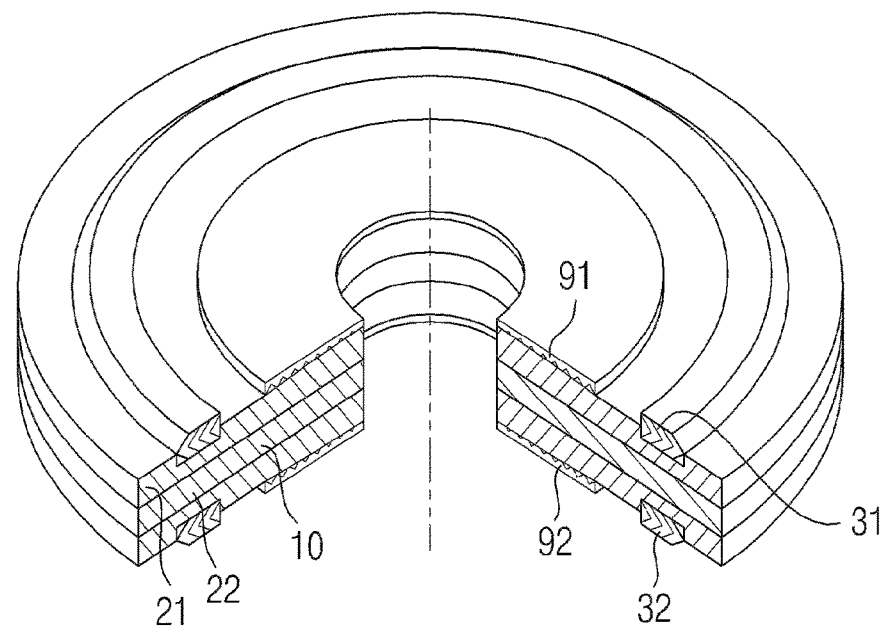
FIGS. 43 and 44 illustrate a gasket according to the twenty-fifth exemplary embodiment of the present invention.
Figure 44:
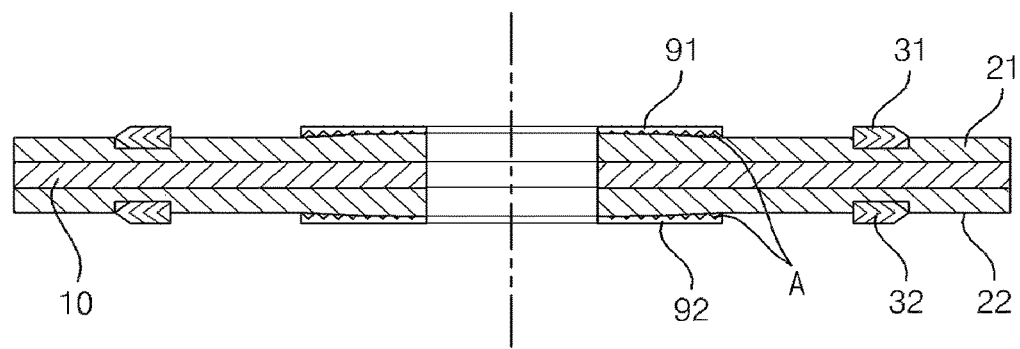

FIGS. 43 and 44 illustrate a gasket according to the twenty-fifth exemplary embodiment of the present invention.

A gasket according to the twenty-fifth exemplary embodiment may further include a first spiral wound gasket unit 31 and a second spiral wound gasket unit 32 in addition to the gasket according to the twenty-third exemplary embodiment.

The radiuses of the first spiral wound gasket unit 31 and the second spiral wound gasket unit 32 may be larger than those of the first sealing layer 91 and the second sealing layer 92.

According to a gasket of the twenty-fifth exemplary embodiment, there is an advantage that an effect of double sealing can be achieved.

Figure 45:
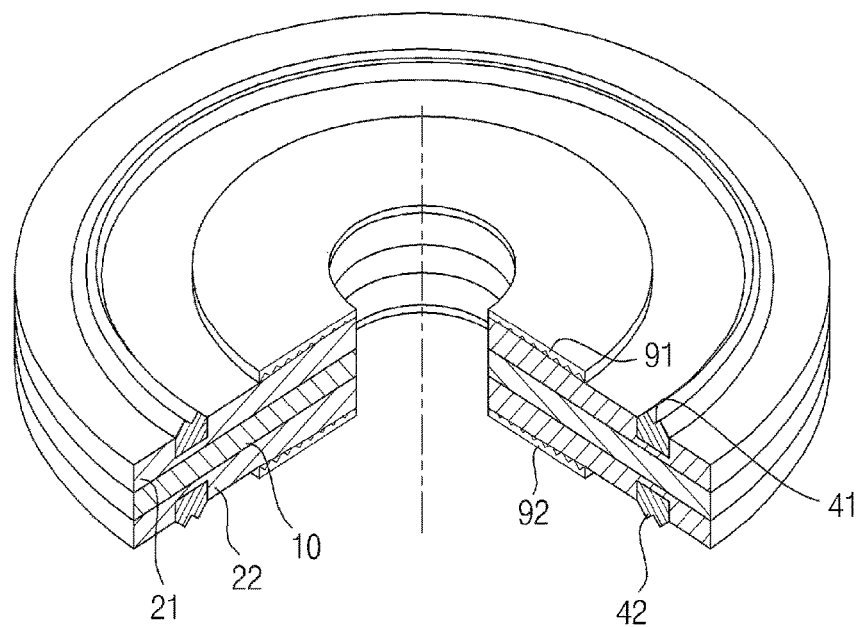
FIGS. 45 and 46 illustrate a gasket according to the twenty-sixth exemplary embodiment of the present invention.
Figure 46:
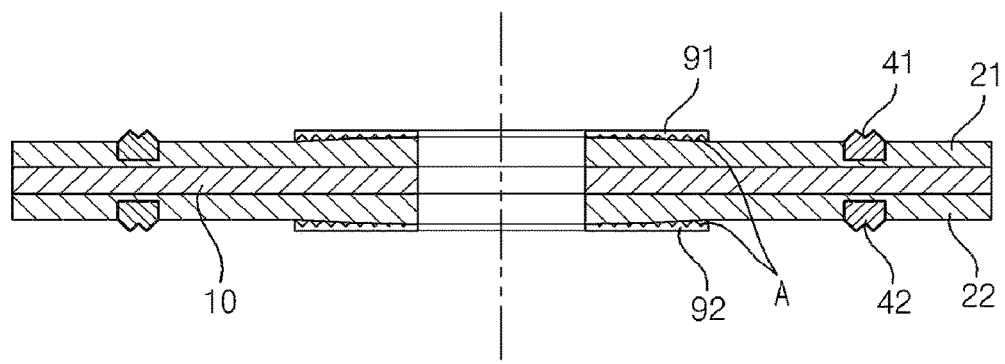

FIGS. 45 and 46 illustrate a gasket according to the twenty-sixth exemplary embodiment of the present invention.

A gasket according to the twenty-sixth exemplary embodiment may further include a third sealing member 41 and a fourth sealing member 42 in addition to the gasket according to the twenty-third exemplary embodiment.

According to a gasket of the twenty-sixth exemplary embodiment, two protruded portions of the third sealing member 41 and the fourth sealing member 42 thereof are tightly in contact with the outer portion of the joint surface of the flanges, thus, there is an advantage of enhancing the sealing effect.

Figure 47:
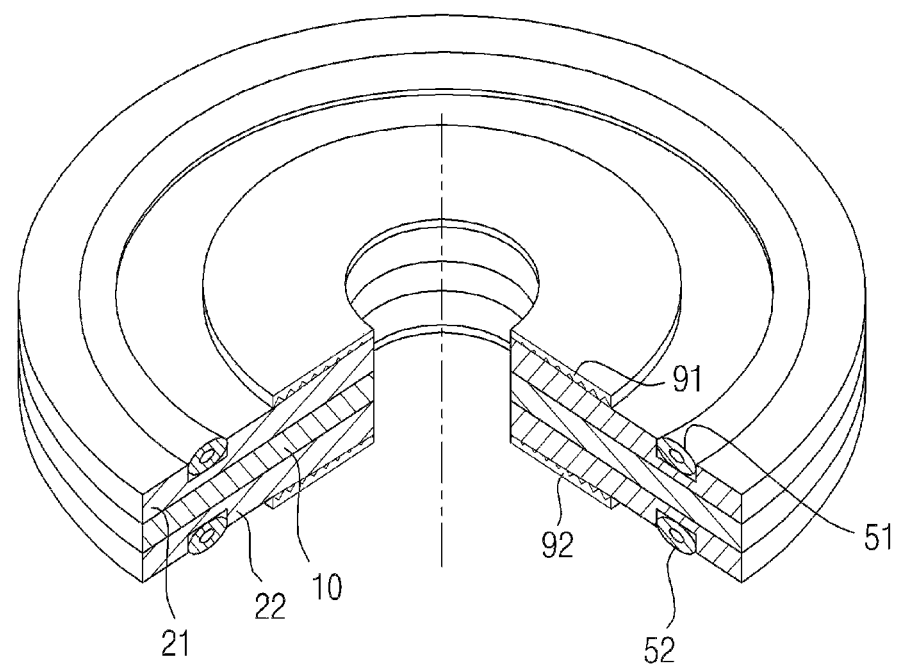
FIGS. 47 and 48 illustrate a gasket according to the twenty-seventh exemplary embodiment of the present invention.
Figure 48:
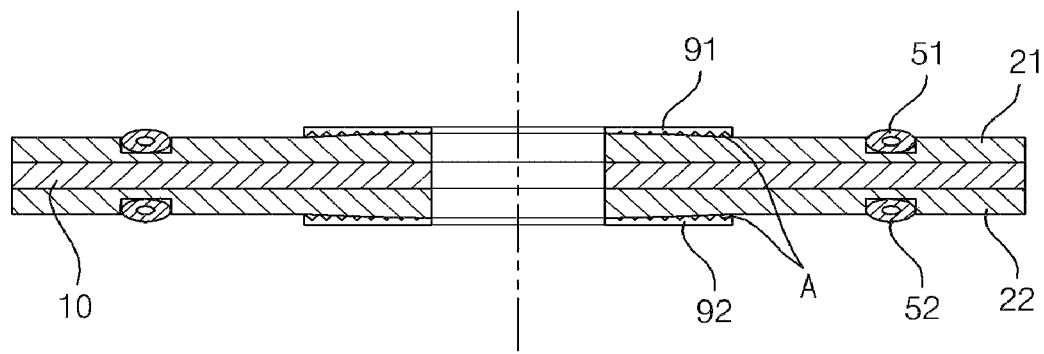

FIGS. 47 and 48 illustrate a gasket according to the twenty-seventh exemplary embodiment of the present invention.

A gasket according to the twenty-seventh exemplary embodiment may further include a first O-ring member 51 and a second O-ring member 52 in addition to the gasket according to the twenty-third exemplary embodiment.

The advantage of enhancing the sealing effect thereof can be enjoyed due to the mounting of the first O-ring member 51 and the second O-ring member 52 in the slots formed on the first layer 21 and the second layer 22 of the gasket.

Figure 49:
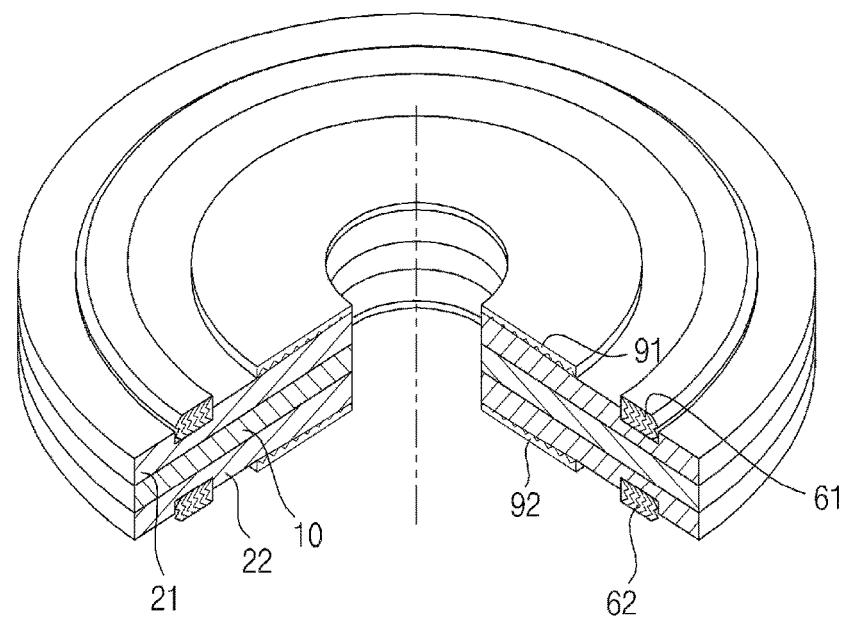
FIGS. 49 and 50 illustrate a gasket according to the twenty-eighth exemplary embodiment of the present invention.
Figure 50:
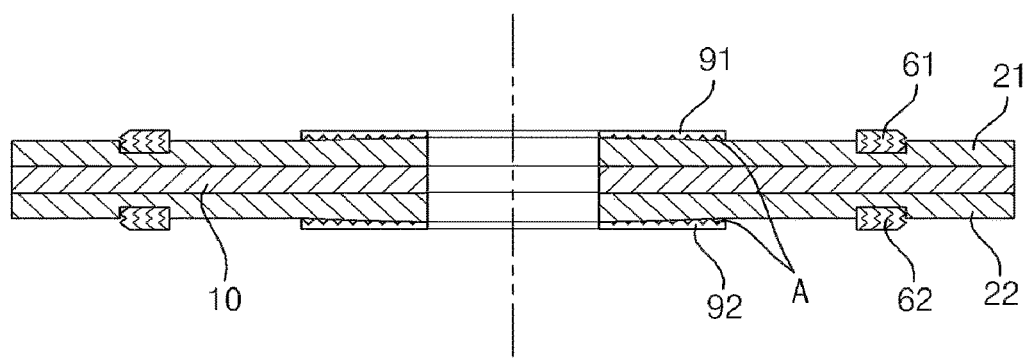

FIGS. 49 and 50 illustrate a gasket according to the twenty-eighth exemplary embodiment of the present invention.

A gasket according to the twenty-eighth exemplary embodiment may further include a third spiral wound gasket unit 61 and a fourth spiral wound gasket unit 62 in addition to the gasket according to the twenty-third exemplary embodiment.

The third spiral wound gasket unit 61 and the fourth spiral wound gasket unit 62 may be comprised of W-shaped hoops made of metallic material and graphite fillers filling the space between the hoops.

According to a gasket of the twenty-eighth exemplary embodiment, the sealing effect of the joint surface of the flanges can be maximized by further providing the third spiral wound gasket unit 61 and the fourth spiral wound gasket unit 62 in the outer circumferential areas of the gasket.

Figure 51:
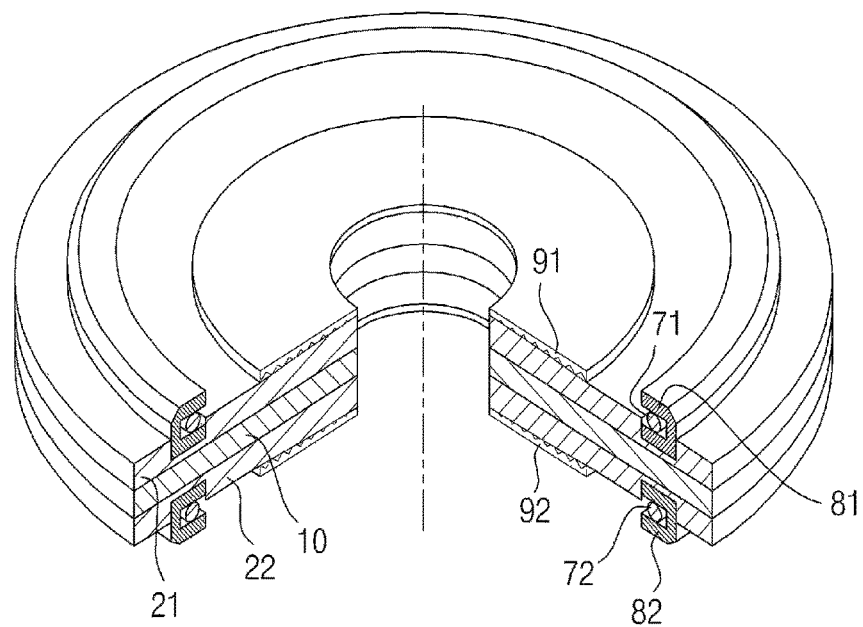
FIGS. 51 and 52 illustrate a gasket according to the twenty-ninth exemplary embodiment of the present invention.
Figure 52:
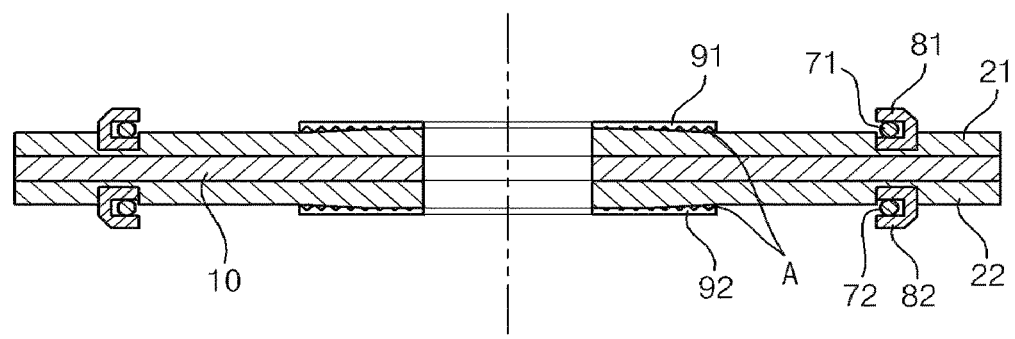

FIGS. 51 and 52 illustrate a gasket according to the twenty-ninth exemplary embodiment of the present invention.

A gasket according to the twenty-ninth exemplary embodiment may further include a first spring 71, a second spring 72, a fifth sealing member 81, and a sixth sealing member 82 in addition to the gasket according to the twenty-third exemplary embodiment.

The fifth sealing member 81 and the sixth sealing member 82 may be mounted in a way that the openings thereof are facing the center of the tube flanges; and the leaking out of the fluid can be prevented due to the expansion of the openings when the fluid is leaking out from the joint area of the tube flanges.

As described above, although the present invention has been described with reference to the preferred exemplary embodiments, those skilled in the art will appreciate that various modifications and changes are possible without departing from the spirit and the scope of the present invention as disclosed in the accompanying claims.

What is claimed is:

1. A gasket comprising:
 a middle layer provided with a through hole;
 a first layer provided on any one surface of said middle layer
 a second layer provided on the other surface of said middle layer;
 a first sealing layer formed on said first layer;
 a second sealing layer formed on said second layer;
 a first sawteeth-like embossed surface, formed between said first layer and said first sealing layer; and
 a second sawteeth-like embossed surface, formed between said second layer and said second sealing layer,
 wherein heights of ridges of sawteeth of said first sawteeth-like embossed surface are substantially same, but depths of valleys between the sawteeth of said first sawteeth-like embossed surface get deeper traveling from a radial center of said first sawteeth-like, embossed surface towards an outside thereof, and
 wherein heights of ridges of sawteeth of said second sawteeth-like embossed surface are substantially same, but depths of valleys between the sawteeth of said second sawteeth-like embossed surface get deeper traveling from a radial center of said second sawteeth-like embossed surface towards an outside thereof.

2. The gasket according to claim 1, further including:
 a third sealing layer, formed on said first layer, having a larger diameter than that of said first sealing layer; and
 a fourth sealing layer, formed on said second layer, having a larger diameter than that of said second sealing layer.

3. The gasket according to claim 2, wherein the cross-section of said third sealing layer has the shape of a half circle, and said third sealing layer is made of rubber, and the cross-section of said fourth sealing layer has the shape of a half circle, and said fourth sealing layer is made of rubber.

4. The gasket according to claim 2, wherein said third sealing layer is formed with graphite or mica material, and said fourth sealing layer is formed with graphite or mica material.

5. The gasket according to claim 1, wherein said first sealing layer is formed with graphite or mica material, and said second sealing layer is formed with graphite or mica material.

* * * * *